United States Patent
Chandrakanthan

(10) Patent No.: US 11,991,962 B2
(45) Date of Patent: May 28, 2024

(54) ADVANCED NUTRIENT FILM AND WELL

(71) Applicant: Advanced Autoponics, LLC, Lakewood, CO (US)

(72) Inventor: Sayon Chandrakanthan, Lakewood, CO (US)

(73) Assignee: Advanced Autoponics, LLC, Lakewood, CO (US)

( * ) Notice: Subject to any disclaimer, the term of this patent is extended or adjusted under 35 U.S.C. 154(b) by 333 days.

(21) Appl. No.: 17/228,455

(22) Filed: Apr. 12, 2021

(65) Prior Publication Data

US 2021/0315174 A1 Oct. 14, 2021

Related U.S. Application Data

(60) Provisional application No. 63/009,687, filed on Apr. 14, 2020.

(51) Int. Cl.
*A01G 31/02* (2006.01)
*A01G 27/00* (2006.01)
*H04N 7/18* (2006.01)

(52) U.S. Cl.
CPC ............ *A01G 31/02* (2013.01); *A01G 27/003* (2013.01); *H04N 7/18* (2013.01)

(58) Field of Classification Search
CPC .... A01G 27/003; A01G 27/008; A01G 31/02; A01G 31/06; A01G 2031/006
See application file for complete search history.

(56) References Cited

U.S. PATENT DOCUMENTS

| | | | | |
|---|---|---|---|---|
| 4,397,114 A | * | 8/1983 | Skaife | B65D 21/08 47/62 C |
| 5,225,342 A | * | 7/1993 | Farrell | A01G 7/00 47/60 |

(Continued)

FOREIGN PATENT DOCUMENTS

| | | |
|---|---|---|
| EP | 2644025 A1 | 10/2013 |
| JP | 2015504656 A * | 2/2015 |

(Continued)

OTHER PUBLICATIONS

KR 101873148 B1 machine translation (Year: 2018).*

(Continued)

*Primary Examiner* — Son T Nguyen
(74) *Attorney, Agent, or Firm* — Adam Hipp

(57) ABSTRACT

Embodiments relate generally to methods, systems and apparatuses for growing plants. For example, a plant growing system (e.g., a hydroponic plant growing system) is provided. The system includes, for example, one or more configurable wells operable to hold a nutrient solution for fertilizing and hydrating one or more plants. In various embodiments, the wells can detach from the unit bottom. The wells allow the roots of various plants to grow downward instead of laterally and obstructing water flow to other plants. The system includes an inlet element, outlet element, a control component, among other such elements and/or components. Water and nutrient solutions flow through the system via the inlet element and outlet element. Outlet element includes an adjustment device configured to control the flowrate and height of water and/or solution in the system. Control component can control one or more devices to ensure optimal plant growth and/or plant growth environment.

16 Claims, 14 Drawing Sheets

(56) References Cited

U.S. PATENT DOCUMENTS

| | | | |
|---|---|---|---|
| 5,273,066 A * | 12/1993 | Graham | A01G 25/167 137/78.3 |
| 7,426,802 B2 * | 9/2008 | Umbaugh, Jr. | A01G 31/02 47/62 A |
| 8,151,518 B2 | 4/2012 | Adams et al. | |
| 8,533,992 B2 | 9/2013 | Harwood | |
| 8,904,705 B2 | 12/2014 | Downs | |
| 10,080,335 B1 * | 9/2018 | Van Wingerden | A01G 31/02 |
| 2013/0074408 A1 * | 3/2013 | Singh | A01G 31/02 47/62 E |
| 2014/0144078 A1 * | 5/2014 | Gonyer | A01G 31/02 47/62 A |
| 2015/0216131 A1 * | 8/2015 | Van Wingerden | A01G 9/0293 47/65.5 |
| 2017/0105368 A1 | 4/2017 | Mehrman | |
| 2017/0223912 A1 * | 8/2017 | Gagne | G01N 29/27 |
| 2018/0325038 A1 * | 11/2018 | Spiro | A01G 9/045 |
| 2018/0368346 A1 | 12/2018 | Watson | |
| 2019/0259108 A1 | 8/2019 | Bongartz et al. | |
| 2019/0335691 A1 | 11/2019 | Krakover | |
| 2020/0275622 A1 * | 9/2020 | Elliott | A01G 29/00 |

FOREIGN PATENT DOCUMENTS

| | | | | |
|---|---|---|---|---|
| KR | 101873148 B1 * | 6/2018 | | |
| WO | WO-2018145199 A2 * | 8/2018 | | A01G 31/02 |

OTHER PUBLICATIONS

Imran Ali Lakhiar, "Modern Plant Cultivation Technologies in Agriculture Under Controlled Environment: a Review on Aeroponics", May 2018.

Kevin Williams, "Arduino-Powered Aeroponics", Aug. 31, 2019.

* cited by examiner

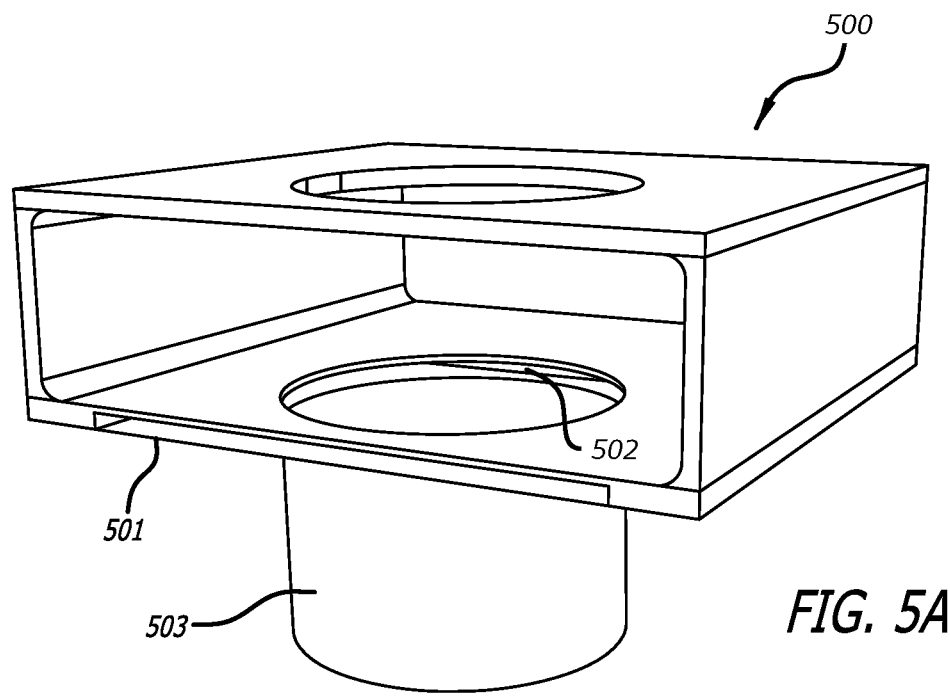
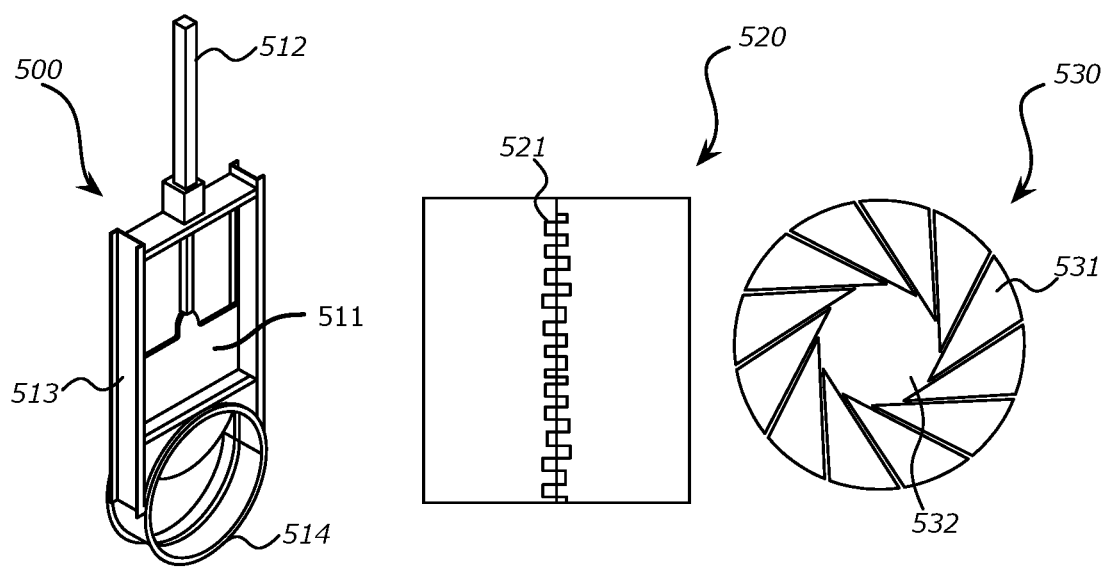
FIG. 5A
FIG. 5B    FIG. 5C    FIG. 5D

ADVANCED NUTRIENT FILM AND WELL

CROSS REFERENCE TO RELATED APPLICATIONS

The present application claims priority to U.S. provisional application No. 63/009,687, filed Apr. 14, 2020, and entitled "ADVANCED NUTRIENT FILM AND WELL", which is hereby incorporated herein in its entirety for all purposes.

BACKGROUND

Hydroponics is a system in which plants are grown in a nutrient solution rather than soil. A variety of hydroponic techniques have been developed including nutrient film technique (NFT), top-feed drip systems, water spray systems, aerosol spray systems (also referred to as aeroponics), wicking systems, deep water culture, raft culture, ebb-and-flow techniques, and systems utilizing fish waste as the plant nutrient (sometimes referred to as aquaponics or aquaculture). Although successful in some situations, conventional hydroponic systems, such as an NFT system, suffer from a number of challenges that have impeded its adoption or widespread success. For example, the needs of plants, including nutrient, water, light, physical support, etc., vary significantly over the plant's lifecycle. This makes it difficult for an integrated mechanical system to meet the needs of a plant as those needs change dramatically over the plant's life cycle. For example, plant roots can create a dam that impedes water (supplemented with nutrients) from reaching plants positioned further downstream of the water flow. As a result, successful hydroponic systems have generally been limited to a small class of plants, such as herbs, lettuce, and tomatoes, that grow quickly and well in a nutrient solution. Accordingly, it is desirable to provide improved techniques for hydroponic systems that can accommodate the changing needs of a plant and can meet those needs at scale.

BRIEF DESCRIPTION OF THE DRAWINGS

Various embodiments in accordance with the present disclosure will be described with reference to the drawings, in which:

FIGS. 5A-5D illustrate a cross sectional view of an area of a plant growing unit in accordance with various embodiments;

DETAILED DESCRIPTION

Figure 1A:
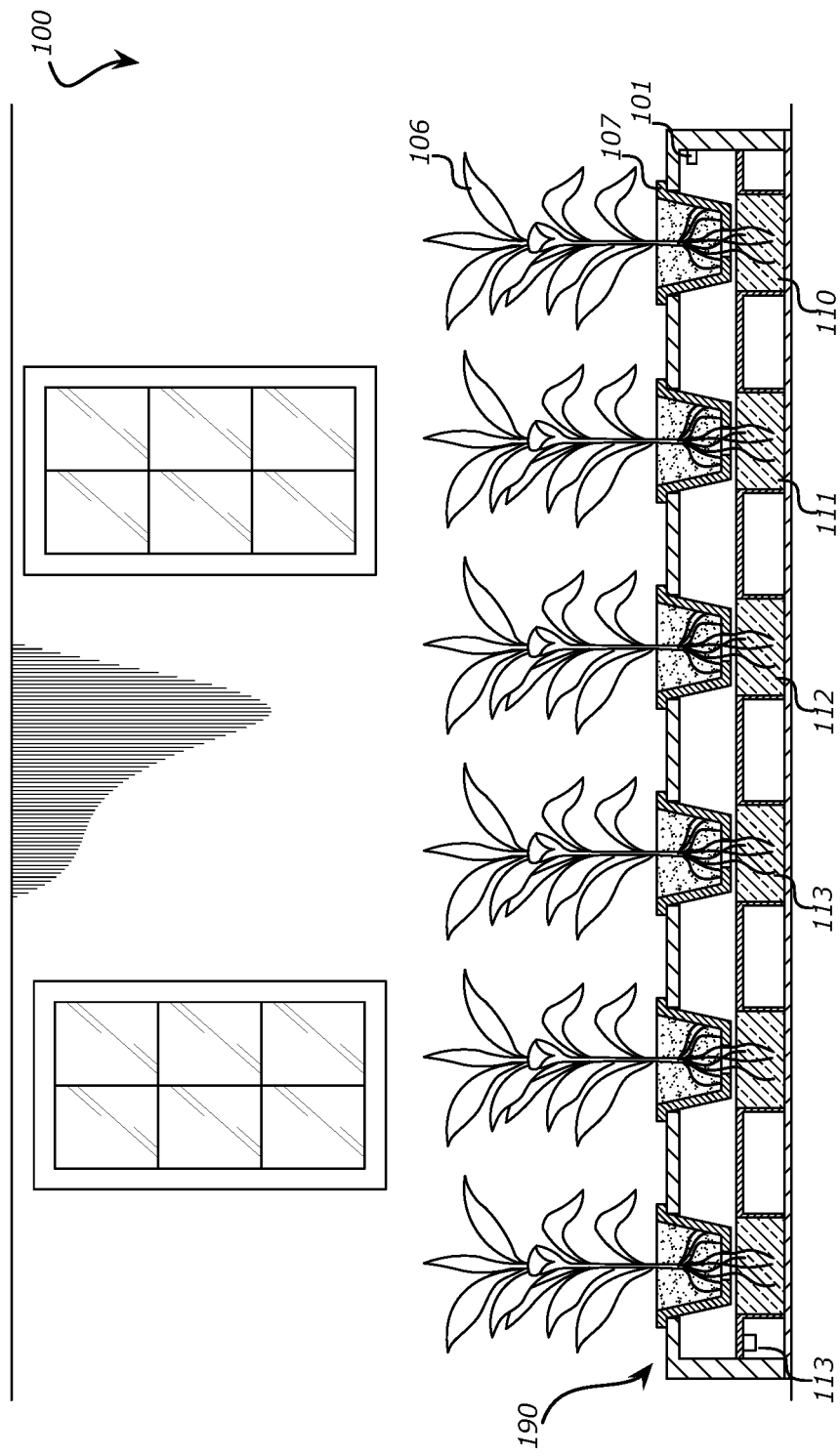
FIGS. 1A-1C illustrate example views of a plant growing unit in accordance with various embodiments.

Systems and methods in accordance with various embodiments of the present disclosure may overcome one or more of the aforementioned and other deficiencies experienced in conventional approaches to cultivating plants. In particular, various embodiments describe methods, services, systems, and apparatuses for a hydroponic growing system that is modular and scalable for growing plants. For example, a plant growing system (e.g., a hydroponic plant growing system) is provided. The system includes, for example, one or more configurable wells operable to hold a nutrient solution for fertilizing and hydrating one or more plants. In various embodiments, the wells can detach from the bottom of the unit. The wells can be hallowed on the inside and can allow the roots of various plants to grow down into them instead of growing outward along the bottom. The system includes an inlet element, outlet element, a control component, among other such elements and/or components. The inlet element is operable to couple to an appropriate transfer component for inlet water and nutrient flow. The outlet element is configured to operate as an outlet for the water and/or other solutions. Outlet element includes an adjustment device configured to control the rate of flow and height of the water and/or solution in the system. The control component is operable to control one or more devices to ensure optimal plant growth and/or plant growth environment.

Advantageously, embodiments described herein provide for sidewalls increased in height, which allows plant roots of larger plants to sit higher above the water, providing the roots with oxygen. Further, because individual wells are smaller than the width of the plant growing unit, water can move along the sidewalls of the plant growing unit to reach other plants. Further still, wells of different depths can be "hot-swapped" without disruption of water to other plants and can accommodate plants of various sized roots. Various embodiments allow for adjustable wells to be converted to fit a spray system to become aeroponics. Further, the wells can provide much-needed nutrients in the situation of an unexpected shutdown, or another event such as pump failure, by maintaining sufficient water until water circulation is established. Further still, whereas conventional NFTs allow for a film of water to move along the bottom, embodiments described herein allow for various heights of water, which lends itself to additional uses, such as an automated cleaning routine. The control unit and various sensors can enable the plant growing system to automate water flow, temperature, humidity, etc., saving time and expense to an owner of such a system. For example, in conventional NFTs, the roots must touch the bottom film, which new growers may find hard to do with young seedlings as their roots have hardly developed. In accordance with various embodiments, the control unit can automatically calibrate the exit flow to increase flow and increase water height to make it easier for those who have planted seedlings to keep the roots moist until the roots further develop to where they can decrease the water height. Further still, the plant growing unit can be made out of more robust materials than a conventional unit to allow a plant support system to be added if desired for larger plants. The support system is designed to allow light to pass through to the plants. The modular plant growing unit includes components to be added or removed, such as automation components, plant support components, various sized wells, and the total size of the plant growing unit. The size of the unit can be designed for one plant or more.

Various other functions and advantages are described and suggested below as may be provided in accordance with the various embodiments.

FIG. 1A illustrates an example situation 100 of a front cross-sectional view of a series of plants 106 suspended in a plant growing unit 190 in accordance with various embodiments. Plant 106 sits in a net pot 107. The net pot 107 (also referred to as a basket) may be, for example, a container (e.g., plastic, clay, resin, metal mesh, etc.) with at least a hole at the bottom for the lower roots of plant 106 to extend downward through the plant growing unit 190 and into a corresponding well 110. Net pot 107 may contain soil, sand, potting gravel, among others or a combination thereof, to hold nutrients for the upper roots of plant 106. In an embodiment, soil plants can be placed in a net pot 107, with rockwool or other material placed at the bottom of the net pot 107 to prevent soil from entering the system. The well 110 may be of adjustable depth to accommodate the length of the lower roots of plant 106. The well 110 may hold nutrient solution for fertilizing and hydrating the lower roots of plant 106. Net pot 107 is removeable from the plant growing unit 190, allowing for the entire plant 106 to be easily transferred from the plant growing unit 190 and relocated. When plant 106 and its corresponding net pot 107 are removed, the corresponding well 110 may also be removed and the cavity in the plant growing unit 190 for the well 110 may be shut with a watertight seal. The "swapping" of well 110 and watertight seal are discussed in further detail in FIGS. 5A-5D.

As shown in this example, the plant growing unit 190 houses the horizontal space around the wells 110 and the horizontal space above the wells 110 (e.g., the system is enclosed). In another embodiment, such as shown in FIGS. 1B and 1C, plant growing unit 190 houses the space above wells 110 (e.g., the system is not enclosed).

In the example, water (or nutrient solution, etc.) flows into the plant growing unit 190 through inlet pipe 101 on an inlet end (also referred to as inlet side) of the plant growing unit 190. Water fills and flows through the enclosed horizontal space above the wells 110, passing through the roots of each suspended plant 106. Water exits the plant growing unit 190 through outlet pipe 102 on an outlet end of the plant growing unit 190. The wells 110 may be extended in depth to accommodate the lower roots of plant 106, such that the roots can grow downward (e.g., the roots can be suspended freely over wells 110), as opposed to growing laterally and/or densely within a vertically restricted space. Therefore, roots of plants positioned upstream (e.g., plants closer to inlet pipe 101) will not dam up or impede the water flow to plants positioned downstream (e.g., plants closer to outlet pipe 102).

Figure 1B:
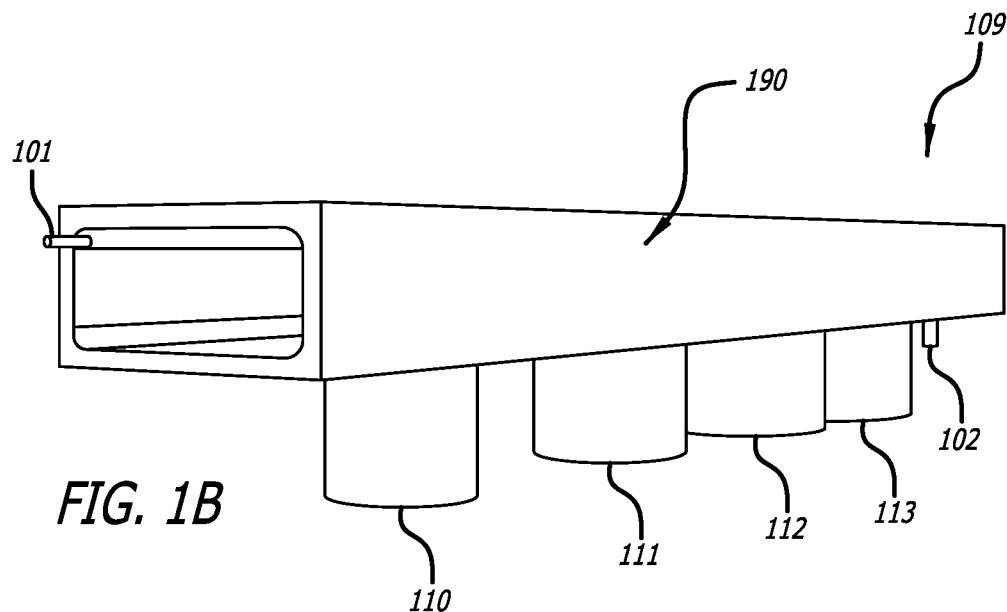
Figure 1C:
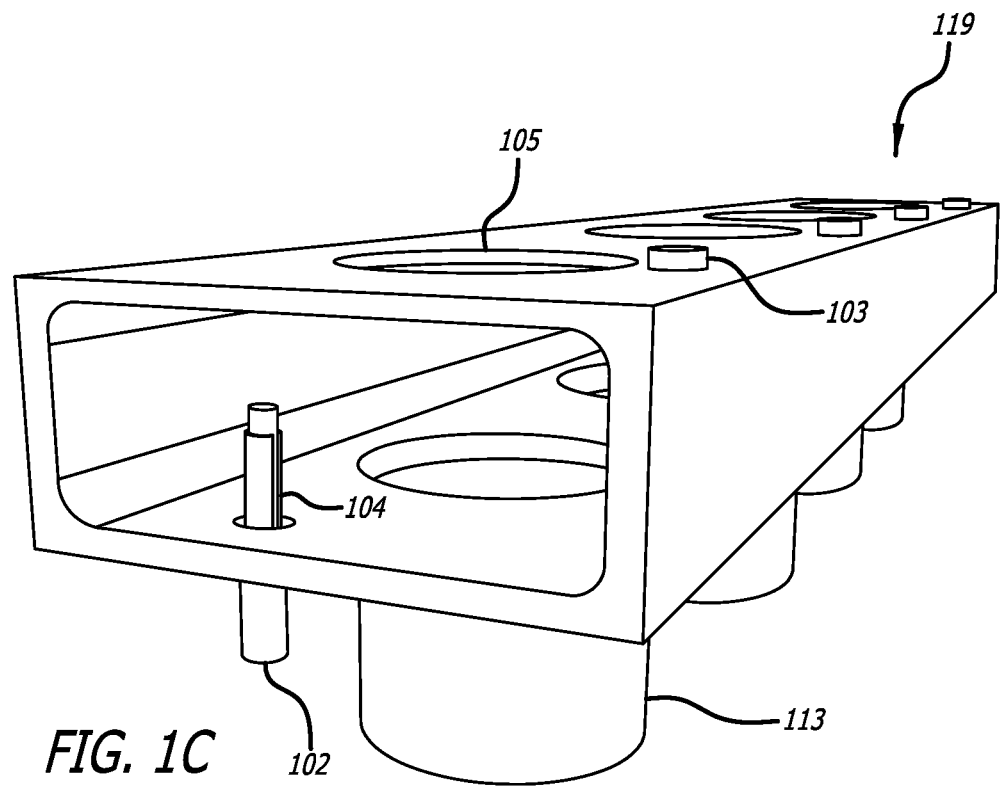

FIG. 1B illustrates an example side view 109 of the plant growing unit 190 in accordance with various embodiments. In this example, plant growing unit 190 can include a viewing window 114 that allows for viewing into the plant growing unit 190. The viewing window 114 includes a transparent pane (e.g., a glass pane, plastic pane, etc.) installed in a cutout on a front end (e.g., the inlet side) of plant growing unit 190. In an example, the cutout can be rectangular in shape with rounded sides. The cutout is also known as a stadium. It should be noted that any one of a number of shapes can be utilized in accordance with embodiments described herein. In another embodiment, an opaque wall covers the front end entirely instead of a viewing window 114 if, for example, the plant roots require darkness.

The bottom of plant growing unit 190 includes nutrient solution containers 110, 111, 112, and 113 (also known as wells, containers, chambers, or other growing media containers.) Although four wells are shown, any number of wells can be utilized in accordance with the embodiments described herein. For example, plant growing unit 190 can be scaled up or down to add more plants if necessary. In an example, plant growing unit 190 can include fewer or additional wells. Wells 110, 111, 112, and 113 can be impermeable as to hold any water or nutrient solution for the lower roots of the corresponding suspended plants, and may be made of stainless steel, plastic, etc.

The wells 110, 111, 112, and 113 are operable to hold a nutrient solution for fertilizing and hydrating one or more plants 116. The wells can detach from the bottom of the plant growing unit 190. The wells can be hollowed on the inside, allowing roots of various plants to grow down into the depth of the wells 110, 111, 112, and 113, instead of growing outward (e.g., laterally) along a uniform floor of a hydroponic enclosure in a conventional NFT (nutrient film technique). Advantageously, such characteristics allow for larger plants to have greater root density to intake nutrients and prevent dams from forming, which can decrease the outlet flow rate. Additionally, if any mechanical components of the plant growing unit 190 were to fail, the water depth of the wells can provide nutrients for the plants to live on without the recirculation of water. Additionally, since plant growing unit 190 is not filled with water, roots of the plants 106 continue to obtain oxygen in the situation where the air pump were to cease operating.

On the inlet end of plant growing unit 190 is inlet pipe 101. Inlet pipe 101 is operable to couple to a tube of metal, plastic, or other material for inlet water flow. Inlet pipe 101 can be placed internally if the system is enclosed (e.g., see FIG. 4). On the opposite side, e.g., the rear end of the plant growing unit 190 or outlet end, is outlet pipe 102 coming out of plant growing unit 190. Outlet pipe 102 is configured to operate as an outlet for the water and/or other solutions. The size of outlet pipe 102 can be greater than the size of inlet pipe 101 to accommodate for various flow rates determined by the system. Outlet pipe 102 can also be connected to piping or can be drained to a device below or internally if the system is enclosed (e.g., see FIG. 4). The inlets and outlets can be metal, plastic, flexible tubing, etc. Inlet pipe 101 and outlet pipe 102 can allow the system to be connected to a reservoir (not shown) located remotely from the plant growing unit 190 or incorporated into the plant growing unit 190 (e.g., see FIG. 4). The system can use the reservoir for water recirculation. For example, the reservoir can collect the water from the outlet and pump the water or nutrient solution back into the system. The reservoir can repeat the recirculation over a plurality of cycles, ensuring that any nutrients in the water that did not get absorbed by the plants during a first cycle (e.g., the first time the nutrient solution flows through the system) can get absorbed during subsequent cycles.

In another example, the reservoir can also filter the water as it recirculates the water. The reservoir can collect used water (e.g., wastewater, drain water, output water, or recirculated water) that is drained out from the outlet pipe 102.

It should be noted that water exiting the outlet pipe may be referred to as output water, wastewater, drain water, or recirculated water. For example, output water, drain water, recirculated water, or wastewater may be used to refer to water exiting the outlet pipe. In another example, wastewater may be used to refer to water exiting the outlet pipe that is not recirculated. In yet another example, recirculated water may refer to water exiting the outlet pipe and at least some form of the water reentering the system. For example, recirculated water may exit the outlet pipe, enter a reservoir or other such water system (e.g., a filtration system), and then reenter into the system.

The reservoir may include a pump and a filter in front of the pump, so that the recirculated water can be filtrated as it is pumped back into the system through inlet pipe 101. In another example, the recirculated water may be discarded manually or automatically, and the reservoir is replenished with fresh water. In yet another example, there may be a separate reservoir for collecting recirculated water and another reservoir for supplying fresh water (or nutrient solution).

In accordance with various embodiments, as water flows from inlet pipe 101 to outlet pipe 102, plant growing unit 190 begins to fill water into the wells 110, 111, 112, and 113. The floor of the space above the wells 110, 111, 112, and 113 may be level, and the water may flow from inlet end to outlet end based on water flow rate from inlet pipe 101. In some embodiments, from the inlet to the outlet there is a decrease in gradient to allow the water to easily flow from one side to the other based on gravity.

The flow rate of water moving through the system may be controlled by adjusting the inlet pipe 101, the outlet pipe 102, the pump (not shown), or a combination thereof. For example, the outlet pipe 102 may be adjusted via adjustment device 104 to control the, discussed in further detail in FIGS. 1C and 2A. In another example, accelerating the pump increases the amount of water sent through the inlet pipe 101, which increases the amount of water going through inlet pipe 101 per unit of time, thereby increasing the flow rate of water entering the system. Decelerating the pump decreases the amount of water sent through the inlet pipe 101, decreasing the amount of water going through inlet pipe 101 per unit of time, thereby decreasing the flow rate of water entering the system. The flowrate in the system can be maximized if the pump is pumping the appropriate amount of water to match the flowrate at which the inlet pipe and/or the outlet pipe are set. In yet another example, the opening of inlet pipe 101 may be adjusted (e.g., repositioned, decrease or increase the size of the inlet pipe opening, etc.) to change the flow rate of water by controlling how much water can flow through inlet pipe 101 per unit of time, thus controlling how quickly or slowly the water enters the system.

In another embodiment, the inlet pipe 101 may include an inlet valve (not shown) which adjusts the flowrate of water entering through the inlet pipe 101 may be encased in the inlet pipe 101, wherein a cutout in the inlet pipe 101 exposes the port of the inlet valve. Rotating the inlet valve about an axis parallel to the length of the inlet pipe 101 changes the size of the port of the inlet valve, which changes the flow of incoming water. An actuator may be coupled to the inlet valve to rotate the inlet valve. The actuator may be an electric motor, hydraulic moto, pneumatic motor, and the like.

Plant growing unit 190 can be made out of plastic, metal, composite materials, or other materials or a combination of materials. A top portion of plant growing unit 190 can be removable. Once the top portion is removed, a user can also access the components inside of plant growing unit 190.

FIG. 1C illustrates example 119 of plant growing unit 190 from the perspective of the outlet side. As shown, the top portion of unit 190 includes cutout 105. Cutout 105 can be one of a number of shapes. In this example, cutout 105 is circular. Each cutout can be positioned with respect to a corresponding well. For example, cutout 105 can be positioned substantially above well 113. Positioning a cutout can include, for example, aligning edges of cutout 105 with well 113, a reference point (e.g., edge area of a well), or other approach. In various embodiments, individual wells can be placed with respective edges sitting on the side of plant growing unit 190. Cutout 105 allows for a net pot 107 to be securely suspended on the top of plant growing unit 190, such that the roots of a plant, such as plant 106, can hang freely down through the plant growing unit 190 and into a corresponding well 113. Net pot 107 may be suspended over cutout 105 by an overhanging lip around the edge of net pot 107. In another example, net pot 107 may be screwed into the cutout 105, or the lip of the net pot 107 may be seated into a groove around the edge of cutout 105, and so forth. Cutout 105 allows for net pot 107 to be removed entirely from plant growing unit 190 for easy transfer or relocation of the plant, without disturbing neighboring net pots containing plants already positioned in plant growing unit 190. Further, the cutouts 105 securely suspends the net pots 107 such that a user can transfer an entire row of plants 106 in net pots 107 simultaneously by simply removing the top portion of plant growing unit 190.

Depending on the plant, the distance between the cutouts 105 can be changed to allow for adequate growth (e.g., roots may grow densely, laterally, vertically, etc.) and to use space efficiently (e.g., roots may get tangled with roots of neighboring plants if spaced too closely, but may require longer time for water to reach downstream roots if spaced too far apart). The number of cutouts and/or size (e.g., diameter) of the cutouts can be adjusted to increase efficiency for the type of plant. For example, smaller plants or seedlings may require smaller cutouts, and the smaller size allows for the plant growing unit 190 to fit a higher number of cutouts for more plants. In another example, plants whose roots tend to grow thick or highly fibrous may require lower number of cutouts to increase the distance between cutouts, to prevent roots from getting tangled with roots of a neighboring plant or prevent roots from damming up water from reaching plants downstream.

A cylindrical device 103 can be positioned proximate to each cutout 105. A cylindrical device 103 can, for example, attach to a plant support element (not shown). For example, a plant support element may be mounted onto plant growing unit 190, such as by screwing the plant support element into cylindrical device 103. It should be noted that other mechanisms may be used to secure a plant support element with a cylindrical device, such as a collapsible mechanical pole, magnets, snap connectors, etc. The plant support element may be, for example, a vertical rod, lattice, trellis, etc., which can guide or secure a plant to stay upright. The plant support element is discussed in further detail in FIG. 7.

Outlet pipe 102 can have an outlet valve which includes and is controlled by adjustment device 104. Adjustment device 104 is a device which regulates, directs, or controls the flow of water and/or nutrient solution by opening, closing, or partially obstructing a passageway (e.g., valve port, valve opening, etc.) for the water and/or nutrient solution. For example, adjustment device 104 can be a valve, an adjustable valve, adjustment valve device, etc. Adjustment device 104 is attached to outlet pipe 102 and can be configured to control the height of the water in the system as well as the flow rate of water. Adjustment device 104 can be controlled manually or as part of an automated system. In the situation where adjustment device 104 is controlled as an automated feedback system, adjustment device 104 can be controlled based on system or environmental characteristics, such as, for example, the reading of the inlet and outlet flow rate, plant root growth, etc. For example, to determine the flow rate, flow rate monitors can be placed throughout the system to collect such readings. In an example, a flow rate monitor can be placed near the outlet end and/or the inlet end of plant growing unit 190. Individual flow rate monitors can obtain flowrate readings, and adjustment device 104 can be adjusted to control the height of the water. For example, adjustment device 104 may be raised to slow down flow rate, or raised above the water level to stop outlet flow completely. Adjustment device 104 may be lowered to accelerate flow rate. In the situation where the valve of adjustment device 104 is above water (e.g., water remains stagnant in the system), adjustment device 104 may be lowered below the water level to initiate outflow of water.

In yet another example, adjustment device 104 may be rotated to change the flow rate of water. A valve port in adjustment device 104 may be gradually exposed (e.g., the size of the valve port may increase) as it is rotated about the adjustment device 104. In the situation where an environmental characteristic requires low water turbidity (i.e., less particulates or waste in the water) but the automated feedback system reads high water turbidity, the system may control adjustment device 104 to flush the turbid water out quickly. Therefore, adjustment device 104 may be rotated to expose the valve port at its maximum size, increasing outflow of water from the plant growing unit 190.

In another example, the height of the water can be adjusted based on the growth of the roots in the system. In this example, the rate of growth and/or the growth of the roots can be determined by proximity sensors, cameras, LIDAR, etc. The rate of growth and/or growth can be used to adjust the adjustment device 104 to change the water height. For example, during the early development of the plant, the water height should be level with the bottom of the net pots 107 used to suspend the plants above the wells 110, 111, 112, and 113, which allows the rockwool at the bottom of the net pots 107 to absorb water to feed the root system. As such, the adjustment device 104 can be set accordingly such that the water is along the bottom of the net pots 107. As the plant roots grow down into the wells 110, 111, 112, and 113 from the net pots 107, the rate of growth and/or growth of the roots can be used to control adjustment device 104 such that the water height is decreased to allow more oxygen to the roots as the rate of growth increases and/or the growth of the roots increases. Over time, the water can be reduced to a thin layer of water flowing from inlet pipe 101 to outlet pipe 102, refreshing the wells 110, 111, 112, and 113 with oxygen and nutrients as it moves along. With less water in the system, the roots have less chance of developing diseases.

Figures 2A, 2B:
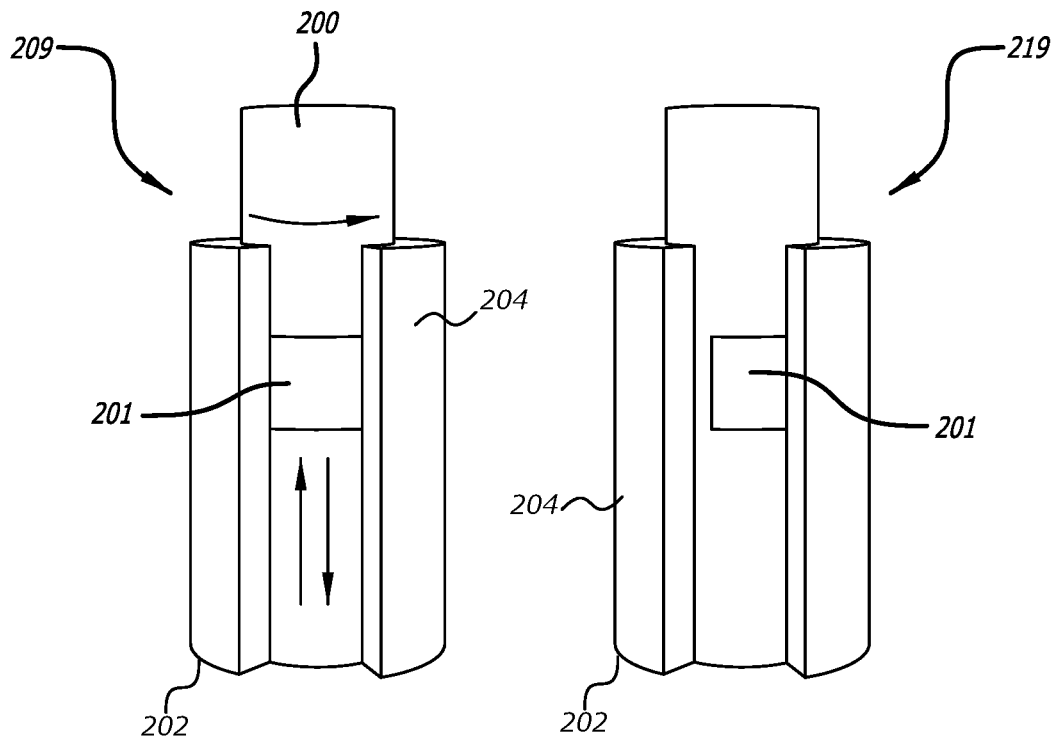
FIGS. 2A and 2B illustrate an example water level and water flow adjustment device of a plant growing unit in accordance with various embodiments.

FIG. 2A illustrates example 209 of a water level adjustment device 202 (also referred to as adjustment device) of a plant growing unit in accordance with various embodiments. In the example, outlet pipe 102 can have an outlet valve which includes and is controlled by adjustment device 202. Adjustment device 202 is a device which regulates, directs, or controls the flow of water and/or nutrient solution by opening, closing, or partially obstructing a passageway (e.g., a valve opening such as valve port 201) for the water and/or nutrient solution. For example, adjustment device 202 can be a valve, an adjustable valve, adjustment valve device, etc. Level adjustment component 200 may be moved vertically to change the water height and/or may be rotated (e.g., about a vertical axis) to change the flow rate of water through the system. In this example, adjustment device 202 includes level adjustment component 200 partially encased in a housing 204. The housing 204 is connected to the outlet pipe 102, and level adjustment component 200 may be a hollow pipe that is fitted within outlet pipe 102 and includes a valve port 201 (e.g., valve opening). Level adjustment component 200 is operable to move vertically to change the water height and/or may be rotated (e.g., about an axis parallel to the length of the adjustment device 202) to change the flow rate of water through the system. Valve port 201 (e.g., a valve opening) allows water to exit the system and flow downward through level adjustment component 200 and out of outlet pipe 102. For example, adjustment component 200 is operable to move up and down along housing 204 to allow for change in the water height in the system based on the vertical position of valve port 201. When level adjustment component 200 is moved upward, so does valve port 201, and therefore the water height in the system is increased. Other environmental characteristics may control when level adjustment component 200 is moved vertically. In the situation where environmental characteristics require more oxygen to the roots (e.g., when the rate of growth increases and/or the growth of the roots increases), level adjustment component 200 may be moved downward such that valve port 201 also moves downward, which decreases the water height in the system and allows for more oxygen to access the suspended roots.

In an embodiment, a pressure valve (not shown) may be attached to the top of adjustment device 202 to move the valve port 201 up or down, changing the water height. The pressure valve may be securely mounted to the top of the plant growing system. In response to environmental characteristics, the pressure valve may push the adjustment device 202 downward or release adjustment device 202 upward along housing 204. In another example, a slide valve may move the adjustment device 202 vertically. Other devices, such as an adjustable valve and actuating arm, can move the adjustment device 202 upward or downward.

In the example, the level adjustment component 200 is also operable to rotate clockwise and counterclockwise about a vertical axis within housing 204, to allow change in the flowrate of water exiting the system through outlet pipe 102. As level adjustment component 200 rotates, valve port 201 becomes gradually exposed (e.g., port, also referred to as valve opening, increases in size) from the housing 204, allowing more water to flow in per unit of time, and flowrate increases. Maximum flowrate may be reached when level adjustment component 200 has rotated such that valve port 201 is completely uncovered by housing 204, allowing for the maximum amount of water to pass through per unit of time. in housing. Level adjustment component 200 may also rotate such that valve port 201 becomes gradually covered by housing 204 (e.g., port diameter, also referred to as valve opening, decreases in size), allowing less water to pass through per unit of time, and flowrate decreases. Flowrate is ceased when level adjustment component 200 has rotated such that valve port 201 is completely covered (e.g., closed) by housing 204. Various environmental characteristics may control when level adjustment component 200 is rotated. For example, when water turbidity is high in the system (e.g., too many waste particulates in the water), the water may need to be drained quickly to reduce chances of plant disease. Level adjustment component 200 may rotate to open or increase the size of valve port 201, increasing flowrate and quickly draining the output water.

In an embodiment, an actuator (not shown) may be coupled to adjustment device 202 to cause rotational movement of level adjustment component 200, changing the flow rate (e.g., of water flowing through valve port 201). The actuator may include an electric motor, hydraulic motor, pneumatic motor, among others. In yet another example, the pressure valve may cause the level adjustment component 200 to move vertically at the same time an actuator causes the level adjustment component 200 to rotate. For example, if the system needs to be quickly drained (e.g., for system maintenance, to transfer an entire set of plants, etc.), the pressure valve may push level adjustment component 200 downward while actuator rotates 200 to open the valve port 201 to its maximum size, thereby lowering the water height and increasing outflow of the water.

FIG. 2B illustrates example 219 of adjustment device 202 wherein valve port 201 is closing. As level adjustment component 200 rotates, valve port 201 decreases in size as it gradually becomes covered by housing 204. Various environmental characteristics may require the rate of outflow of water to decrease or stop, and thus control rotation of level adjustment component 200 to close or reduce the size of valve port 201. For example, in the situation where fresh water or nutrient solution needs to be added to the system, and where the plants require a predefined period of time to effectively absorb the water or nutrients, level adjustment component 200 may rotate to close or reduce the size of valve port 201, such that the water exits the system at a slower rate or stops exiting completely. In another example, suspended plant roots may be short or young (e.g., seedlings), requiring raising the water height to reach the bottom of net pots 107. As water continues to enter the system through the inlet pipe 101, level adjustment component 200 may rotate to close or reduce the size of valve port 201 to slow or stop the outflow of water from the system, allowing the water height in the system to increase and reach the bottom of net pots 107. Once the ideal water height is reaches, level adjustment component 200 may be rotated back such that valve port 201 is at a size that allows for constant flow of water through the system that maintains the current water height for a predefined period of time.

Figure 3:
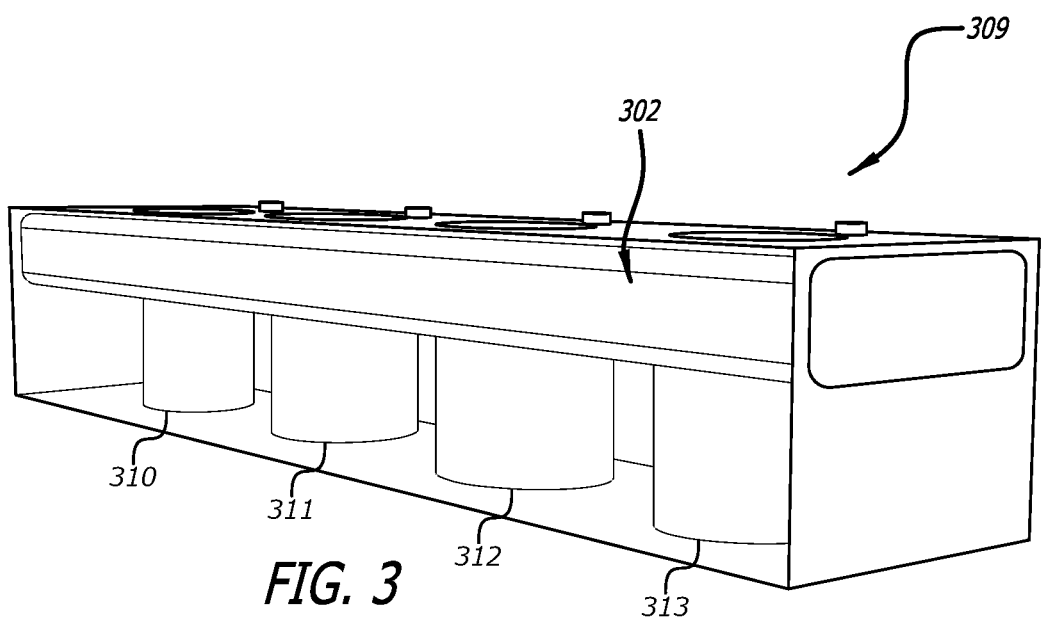
FIG. 3 illustrates an example plant growing unit in accordance with various embodiments.

FIG. 3 illustrates example 309 of an enclosed plant growing unit 302 (as shown in the example situation of FIG. 1A). In this example, the inlet pipe 101, the outlet pipe 102, and wells 310, 311, 312, and 313 are enclosed in enclosed plant growing unit 302. The outlet pipe 102 drains into enclosed plant growing unit 302 without the need of an external pipe or tubing. Additionally, water can be added into the plant growing unit 302 via a water line as the control system observes water level decrease based a certain setpoint. Although four wells are shown, any number of wells can be utilized in accordance with the embodiments described herein. For example, enclosed plant growing unit 302 can be scaled up or down to add more plants within the enclosed unit if necessary. In example, enclosed plant growing unit 302 can include fewer or additional wells. Wells 310, 311, 312, and 313 can be impermeable as to hold any water or nutrient solution for the lower roots of the corresponding suspended plants, and may be made of stainless steel, plastic, etc. As wells 310, 311, 312, and 313 are enclosed within enclosed plant growing unit 302, they can be accessed and swapped through a removable panel (not shown), for example, along the front side of plant growing unit 302. The removable panel may be secured to plant growing unit 302 by magnets, snap connectors, latches, and the like. In another example, the removable panel may be connected to the enclosed plant growing unit 302 with hinges and may be swung or lifted open like a door. The depth of enclosed plant growing unit 302 may be of variable depth to accommodate the depth of the wells 310, 311, 312, 313. For transferring plants en masse or to perform system maintenance, the top portion of plant growing unit 302 may be removable.

Figure 4:
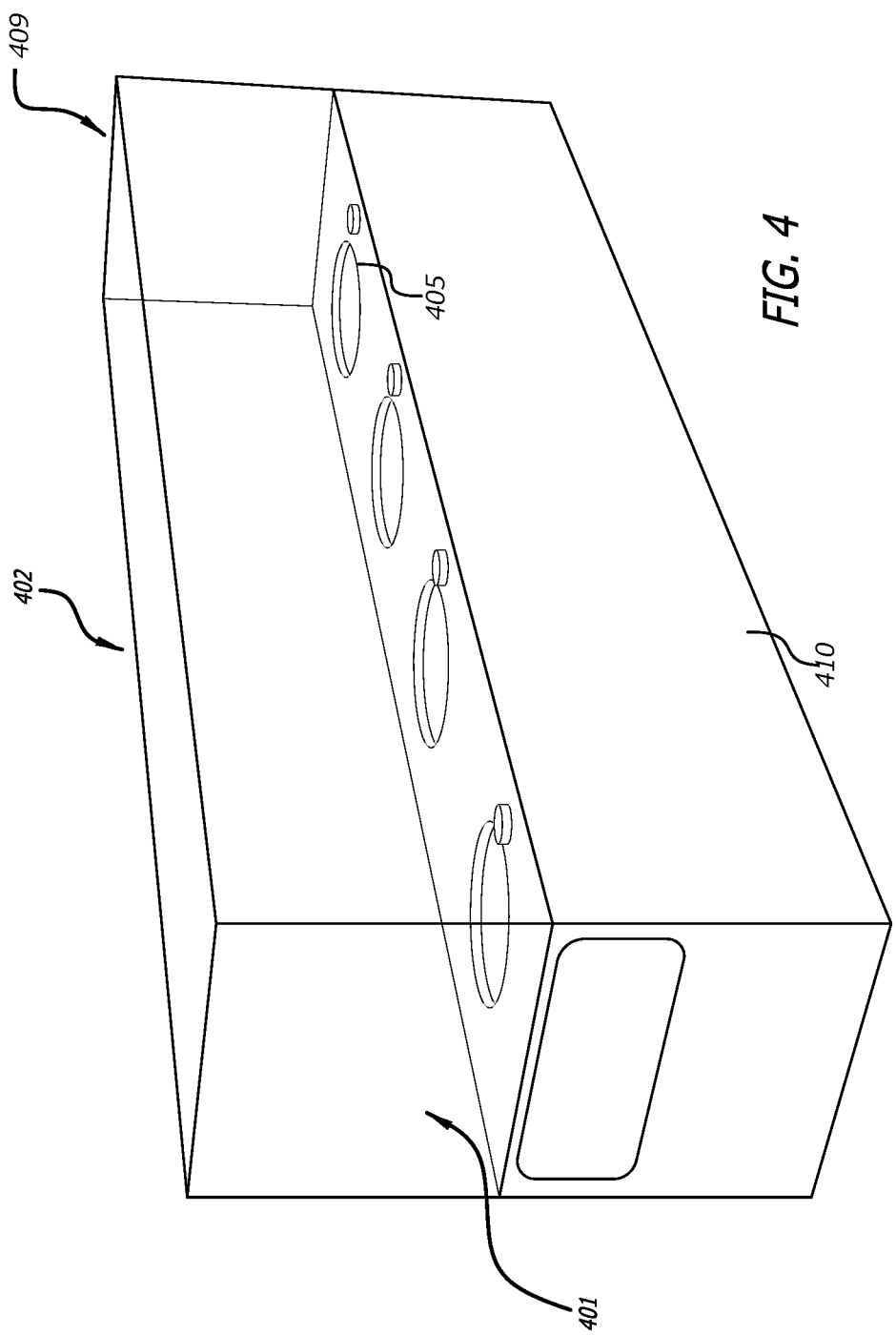
FIG. 4 illustrates an example plant growing unit in accordance with an alternate embodiment.

FIG. 4 illustrates example 409 of a fully enclosed plant growing unit 402 in accordance with various embodiments. In this example, fully enclosed plant growing unit 402 is a fully enclosed unit. For example, at least the reservoir (not shown), inlet pipe (not shown), the outlet pipe (not shown), and the tops of the plants can be encased in the fully enclosed plant growing unit 402. The top casing 401 may encase the top portion of the plants, such as plants which require specific care (e.g., high humidity, variable lighting throughout the day, warmer temperatures etc.). The top casing 401 may block pests or airborne chemicals or pollutants from accessing the plants. In another example, multiple types of plants may be maintained in multiple fully enclosed plant growing units 402, allowing for multiple plant growing systems with different controlled microclimates within each enclosure. For example, one fully enclosed plant growing unit 402 may maintain a specific ambient temperature and humidity for vegetable plants, while a neighboring fully enclosed plant growing unit 402 may maintain another ambient temperature and humidity for succulents. This allows for growing different types of plants at scale when space is limited. The top casing 401 may be removable, for example, to access the inside components of the fully enclosed plant growing unit 402 for system maintenance, pruning and maintaining the tops of the plants, etc.

Below each cutout 405, a corresponding well (not shown) is positioned in the bottom casing 410. As the wells are enclosed within the bottom casing 410 of fully enclosed plant growing unit 402, they can be accessed and swapped through a removable panel (not shown), for example, along the side of bottom casing 410. The removable panel may be secured to the fully enclosed plant growing unit 402 by magnets, snap connectors, latches, and the like. In another example, the removable panel may be connected to the fully enclosed plant growing unit 402 with hinges and may be swung or lifted open like a door.

In this example, as the fully enclosed plant growing unit 402 is a fully enclosed system, the reservoir can be used for water recirculation. For example, the reservoir can collect the water drained from the outlet and pump the water or nutrient solution back into the system. The reservoir can repeat the recirculation over a plurality of cycles, ensuring that any nutrients in the water that did not get absorbed by the plants during a first cycle (e.g., the first time the nutrient solution flows through the system) can get absorbed during subsequent cycles.

In another example, the reservoir can also filter the water as it recirculates the water through the system. Thus, the outlet pipe (such as outlet pipe 102 of FIG. 1A) can drain water into the fully enclosed plant growing unit 402 without the need for external pipe or tubing. For example, the reservoir can collect recirculated water from the outlet pipe, as well as filter the recirculated water, and pump fresh (e.g., filtered) water in through the inlet pipe and back into the system. For example, the reservoir may include a pump configured to pump water into the system via the inlet pipe (such as inlet pipe 101 of FIG. 1A) and a filter (e.g., activated carbon granules, chemical media filters, biological media filters, etc.) positioned ahead of the pump. Recirculated water from the outlet pipe enters the reservoir. As the pump draws the recirculated water toward the inlet pipe, the recirculated water is passed through the filter to remove waste and other particulates. By the time the recirculated water has passed through the filter and subsequently through the pump, the recirculated water has been treated and converted to fresh (e.g., filtered) water upon reaching the inlet pipe and back into the system. In the example, the filter can collect particulates to prevent clogs in the pump, inlet, outlet, or tubing connected to the inlet and/or outlet, thereby preventing damage to the pump and system. Additional layers of filters may be positioned ahead of the pump for more refined filtration. In another example, successive pairs of pumps and filters may be installed into the reservoir for iterative filtration (e.g., progressive levels of increasingly refined filtration).

In an embodiment, the reservoir can include sensors (e.g., pH, water temperature, ambient temperature, light, conductivity, etc.) to detect water quality and/or environmental conditions in the system. In the example, the sensors and other components can be located within the reservoir. In another example, some sensors components may be located in the reservoir while other sensor components are remote the reservoir. In the situation where some of the sensors and components are located in the reservoir, top casing 401 can incorporate lighting, temperature components (e.g., heating and/or cooling components), humidity components (e.g., humidifier and/or dehumidifier), sensors (e.g., temperature, humidity, etc.), and other environmental control components that can be controlled via a control system (not shown).

In an embodiment, the reservoir can include other accessories to treat or modify the water condition in the reservoir. For example, the reservoir may include air stones to aerate the water, or a water heater to change the water temperature, among others. The reservoir may include sensors to monitor the current condition of the water quality and control changes to the condition of the water (e.g., how much oxygen to release into the water through the air stones, when to stop heating the water, etc.). In an example, the air stones can be connected to airline feeds originating from an air pump. In various embodiments, the air pump can be located in the reservoir. In another example, a water heater controlled by the control system is configured to maintain the temperature of the water within one or more setpoints.

FIG. 5A illustrates example 500 of a cross-sectional view of a plant growing unit in accordance with various embodiments. In this example, a side view of the plant growing unit can be seen. In certain embodiments, well 503 can be fitted with pressurized nozzles if the system is used as an aeroponics system. In the situation where the system is used as a hydroponics system, if greater oxygen requirements must be met for each plant, air stones can be place within well 503. In certain embodiments, well 503 can include spray nozzles or other devices to circulate water around the suspended roots within its cavity.

In accordance with an embodiment, each well 503 can be associated with a lid 502, which can be used to shut the cavity of the well 503, creating a watertight seal which allows well 503 to be "hot swapped" (e.g., removed from the system without losing water from the system and/or disturbing the continuous flow of water through the system, and without disturbing neighboring plants and their respective wells). In an example, lid 502 can be a sliding plate that slides over well 503 to cover or uncover the cavity of the well 503. Sliding lid 502 to completely cover the cavity of well 503 creates an airtight and watertight seal. A slot 501 between the floor of the plant growing unit and well 503 allows for installment of the lid 502, sliding the lid 502 across well 503, and for storing the lid 502 when well 503 is in an open position (for example, when the well 503 is being used to accommodate suspended plant roots).

Well 503 may be securely connected to plant growing unit, for example, via magnets, latches, clamps, snap connectors, screw thread along the edge of the well 503 and corresponding screw thread around the edge of the cutout 501 for well 503, and the like. Thus, well 503 can be detachable from the plant growing unit, and sliding lid 502 over well 503 prior to detachment to create a watertight seal allows for hot swapping of the well 503 without water loss, water flow interruption, or other disturbance to the system. Further in the example, well 503 may be entirely removed from the system or replaced with a clean well or a different sized well, etc.

FIG. 5B illustrates an example situation of where the lid 502 is a slide plate 510. In this example, slide plate 511 can automatically (e.g., pneumatic, hydraulic, electric, etc.) or manually be moved into place by sliding over well 503. The body 513 of slide plate 510 may be positioned in slot 501, where the mouth 514 of the slide plate is positioned over and aligned with the opening edge of well 503. Thus, mouth 514 and well 503 are of the same shape (e.g., a well with a square shaped edge would have a corresponding slide plate with a square shaped mouth, etc.). Mouth 514 may be made of water-resistant material, such as rubber, silicon, and the like, such that sliding the plate 511 over well 503 creates a watertight and/or airtight seal. Plate 511 can be manually or automatically moved away from the cavity of well 503 to return slide plate 510 back into the open position, allowing the flow of water into well 503. Actuation of the slide plate 510 may be pneumatic. For example, when activated, a piston may drive handle 512 to push or pull plate 511 into place over or away from well 503.

FIG. 5C illustrates another embodiment, where lid 502 is a set of double doors 520. In the example, the double doors 520 may be positioned in slot 501 over well 503. When closed, double doors 520 may meet at their edges 521 with interlocking teeth to securely shut the doors. The edges 521 may be made of water-resistant material (e.g., rubber, silicon, etc.) to create a watertight and/or airtight seal when the double doors 520 close. To put the well 503 in an open position, the double doors 520 may open upward, downward, or one door up and one door down, etc., to allow for water or other nutrient solution to enter into well 503. In another embodiment, double doors 520 may be made of water resistant and flexible material (e.g., plastic sheet, polyester, nylon, etc.), and can be opened or sealed shut with a zipper.

FIG. 5D illustrates yet another embodiment, where lid 502 is a mechanical iris diaphragm 530. Mechanical iris diaphragm 530 may be positioned in slot 501 over well 503. Mechanical iris diaphragm 530 includes a circular set of overlapping rotary blades 531. As rotary blades 531 unravel (e.g., spiral or expand outward toward the perimeter edge of the mechanical iris diaphragm 530), the aperture 532 increases in size, therefore putting the lid in an open position. As rotary blades 531 spiral inward toward the center point of mechanical iris diaphragm 530, aperture 532 decreases in size until mechanical iris diaphragm 530 reaches a closed position. Rotary blade 531 may be made of water-resistant material (e.g., rubber, silicon, plastic, etc.) such that a watertight and/or airtight seal is created when mechanical iris diaphragm 530 is in the closed position.

Figure 6:
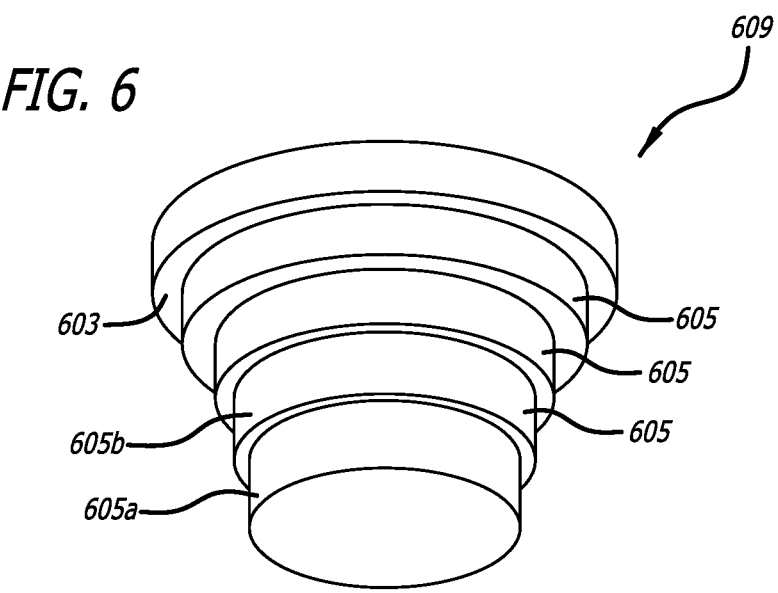
FIG. 6 illustrates an example of a well of a plant growing unit in accordance with various embodiments.

FIG. 6 illustrates example 609 of a well of a plant growing unit in accordance with various embodiments. In this example, a depth of well 603 can be adjusted. The depth of the well can be automatically or manually adjusted. For example, a user can manually adjust the depth of the well by stacking movable components 605 of well 603. For instance, movable component 605a can be pressed into movable component 605b. Once movable component 605a is pressed into movable component 605b, a securing device (not shown), e.g., a latch or other securing mechanism, can secure movable component 605a to the depth of 605b. The depth can be increased by releasing the latch to allow movable component 605a to return to a default depth. In another embodiment, the well can be made of flexible material (e.g., silicon, rubber, etc.) with concentric folds that allows the well to be collapsible and expandable in an accordion style.

Figure 7:
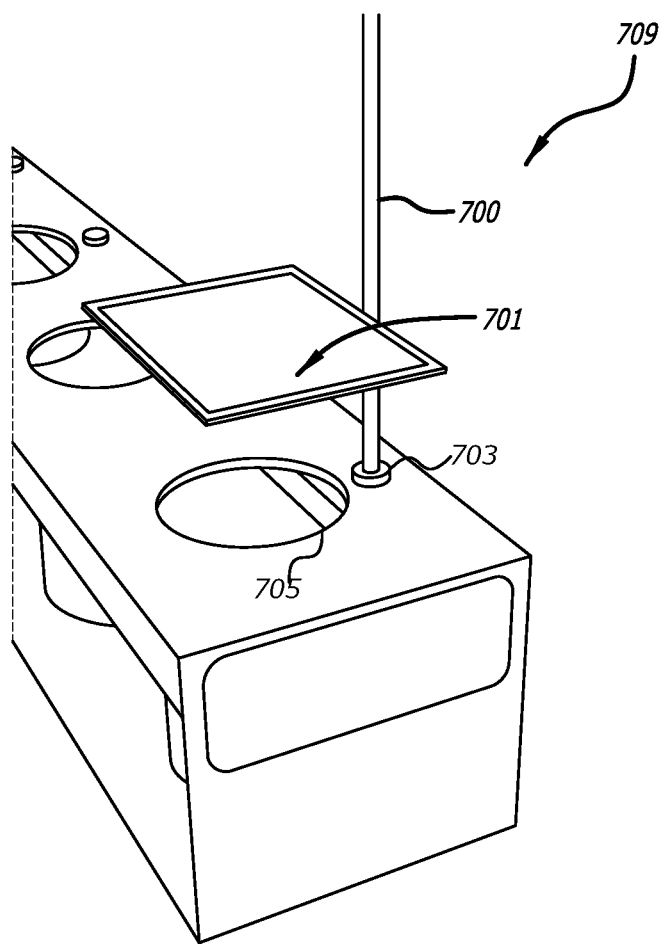
FIG. 7 illustrates a plant support system for a plant growing unit in accordance with various embodiments.

FIG. 7 illustrates example 709 of a plant support system for a plant growing unit in accordance with various embodiments. The plant support system can be utilized for various types of plants such as tomatoes. For example, various plants may require a trellis for vertical growth and/or to distribute more sunlight exposure. In this example, the plant support system can include support nets 701. Support nets 701 can be connected to rod 700 (mounted to cylindrical device 703) as the plant grows at various increments. In an embodiment, support net 701 allows light to pass through to help enable growth. The height of support net 701 may be adjusted along the length of rod 700 or removed and reinstalled at various stages of the plant's life cycle (e.g., as the plant changes in height). Rod 700 and support net 701 are mounted to the top casing of the plant growing unit (and plants are suspended in the cutout 705 of the top casing), and the top casing can be removable, allowing for easy transfer of the plants en masse without disturbance to the plant structure (e.g., plant collapses, etc.).

In another embodiment, support net 701 may instead be a trellis, lattice, or other structure to support the structure of the plant. Support net 701 and/or rod 700 may also be used to hold parts of the plant in place to assist with pruning, grafting, etc.

Figure 8:
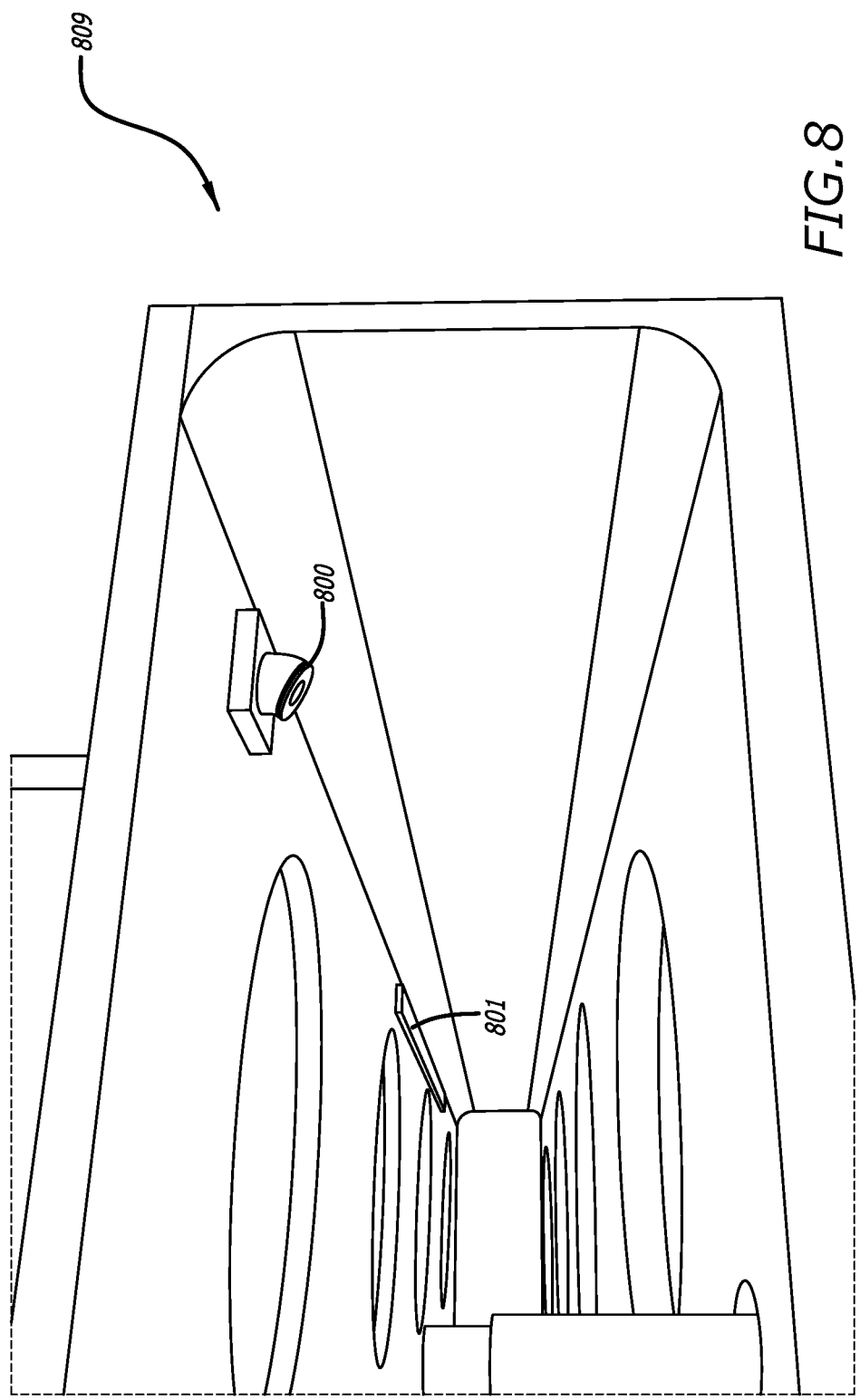
FIG. 8 illustrates example components that can be utilized to control aspects of a plant growing unit in accordance with various embodiments.

FIG. 8 illustrates example 809 of components that can be utilized to control aspects of a plant growing unit in accordance with various embodiments. In this example, a plant growing unit can include camera 800 and light 801. Although one camera and one light are shown, any number of cameras and/or lights can be utilized in accordance with the embodiments described herein. Camera 800 can be a high or low-resolution camera that can include auto-focusing elements for use in still image capture or two-dimensional video capture, and can be, for example, a camera including a complimentary metal-oxide semiconductor (CMOS) device, a motion detection sensor, a charge coupled device (CCD), an infrared sensor, a quantum dot imager, a gallium arsenide sensor, or any other appropriate image capturing technology. As water will be in the system, the camera in certain embodiments would be waterproof and equipped with infrared to provide photo and video capture in total darkness.

Light 801 (also known as an illumination element or light source) can be a white light LED, or other such illumination element, useful in illuminating objects within at least a portion of a field of view of the camera. The device can include other elements useful for imaging as well, such as a light sensor for determining an amount of ambient light. In accordance with various embodiments, growing the roots may require darkness, especially in hydroponics, where algae can grow in the water when the nutrients and lighting come together. While the camera system 800 can be used in the dark, a light 801 can be in place to provide video and photo capture of the roots. For example, a camera can be inside the plant growing unit to provide a view of the inside of the plant growing unit. In another example, each plant can have a camera (e.g., above each corresponding well) to provide a view of each plant. In an embodiment, one or more cameras can be placed to view vegetative growth. The obtained image data (e.g., still images and/or video) can be processed to generate health data for each of the plants, and the health data can be used to control one or more sensors. In various embodiments, lidar can be utilized to provide appropriate data that, when processed, can generate health data for each of the plants.

Figure 9A:
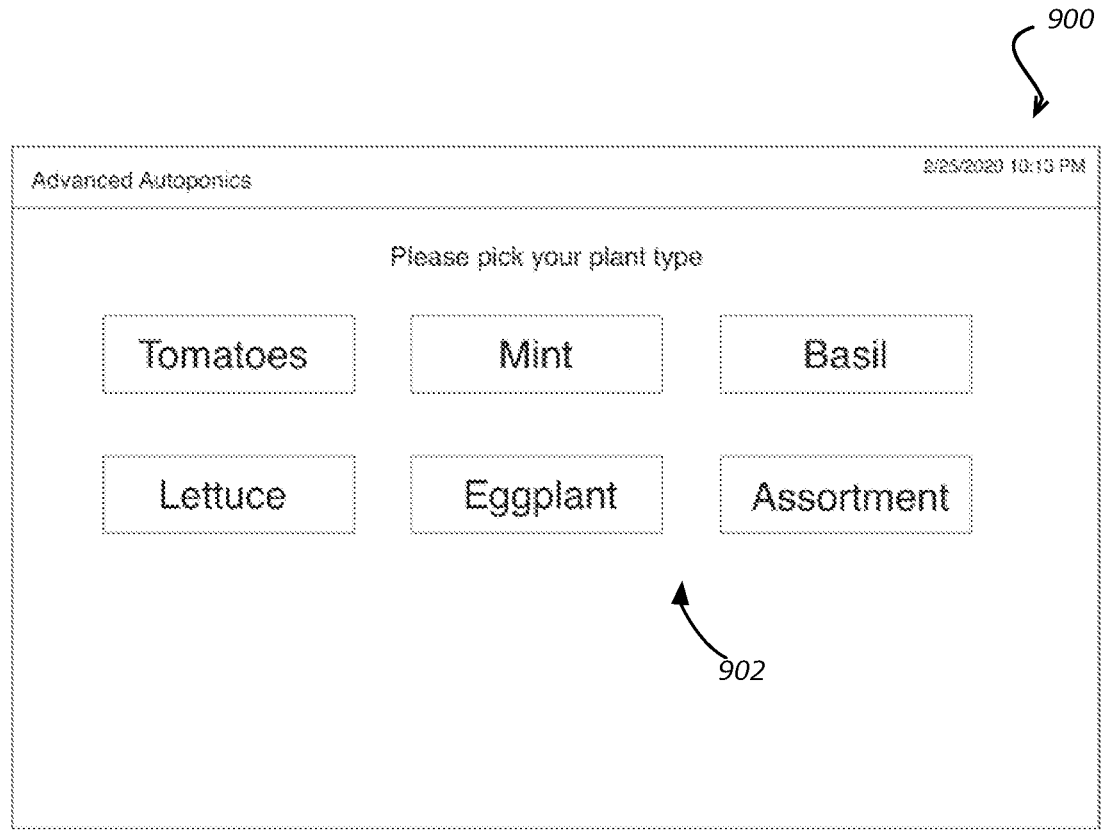
FIG. 9A-9C illustrate example interfaces for a plant growing unit in accordance with various embodiments.

FIG. 9A illustrates example 900 of an interface for a plant growing unit in accordance with various embodiments. In this example, a first starting page from the setup of the hydroponics system is shown. As shown, a user can select from a number of plant types 902. The user can select one or more plants from the list of available plants. In an embodiment, each plant can be different, or individual lines can be different. The user can opt-out in certain embodiments of picking what type of plant they are growing if they prefer not to share. Once the setup is complete, the system automatically determines the appropriate environmental configurations (e.g., growing setpoints, environmental settings) for the system. For example, if a user selects tomatoes, the system will configure environmental settings (e.g., humidity requirements, air temperature requirements, etc.) appropriate for growing tomatoes along different life stages (e.g., seedling, adult stages, etc.) of the plant. Users can also manually enter values for a starting or default environmental configuration. This information will help provide the best setpoints for the system and improve the system and its performance.

In another example, the setup may be automated (e.g., smart setup). Sensors may capture image data of the plants or seeds in the system, and the system may be trained to identify the plants deposited into the system. Thus, the interface 900 may automatically select and/or ask the user to verify the type of plant in the system.

Figure 9B:
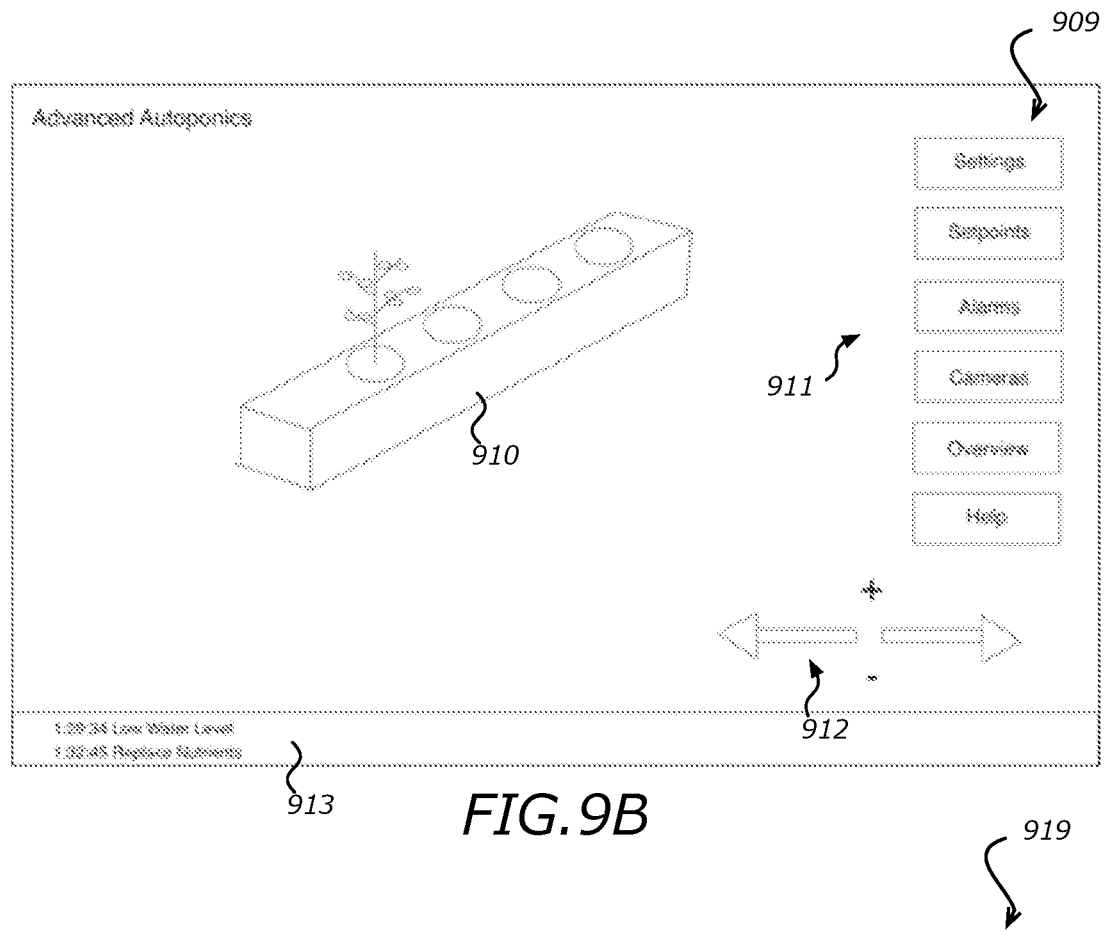

FIG. 9B illustrates example 909 of an interface of the HMI/UI for a growing unit in accordance with an embodiment. In this example, a graphical representation of plant growing unit 910 shows the layout of the system, which can vary with the number of plants incorporated in the design. The system will also show an animation of the progress of plants. Interface control elements 912 allows users to zoom in or pan around the system. Menu 911 provides a layout where users can select to see alarms, setpoints, system settings, various camera angles and/or request support via the help button. The overview shows the current readings from the various sensory inputs. Notification pane 913 provides a view of system alarms and warnings as the system runs, both historical and current.

Figure 9C:
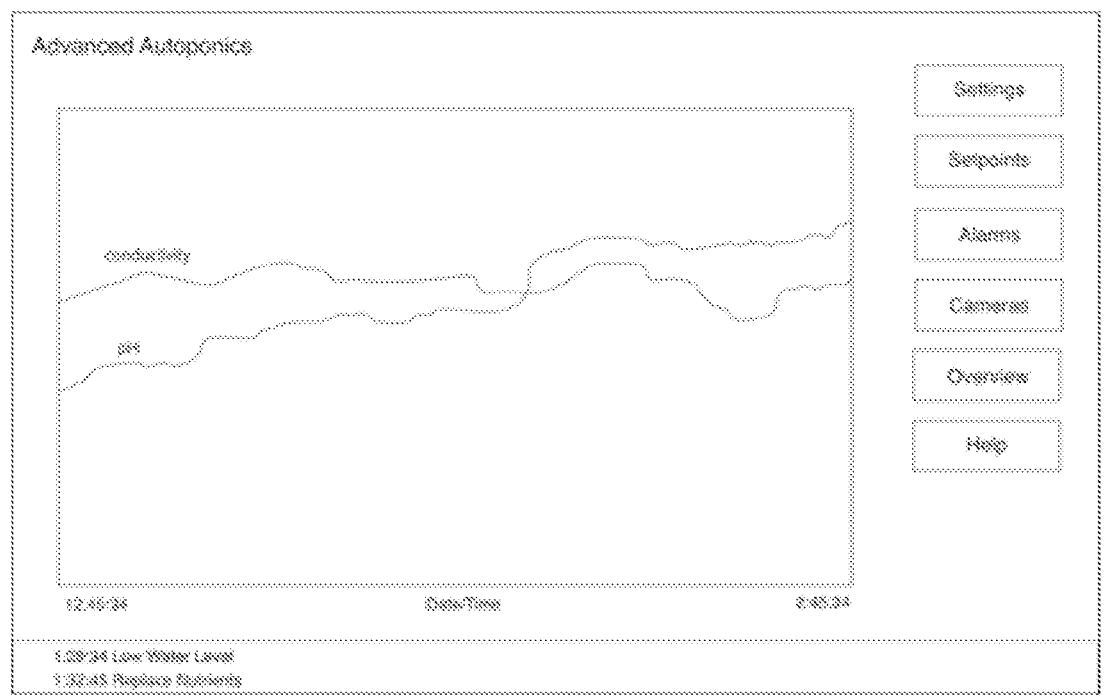

FIG. 9C illustrates example 919 of the current and historical trend information of the sensory information with users picking the start and end time. In accordance with various embodiments, the HMI/UI can be on a computer or mobile device. The help button would give permission to remotely access and see how the system is operating via a remote connection (Wi-Fi, 4G LTE, etc.). From a distance, support can see the system's sensory values and view the camera feeds to help troubleshoot the system from afar.

Figure 10:
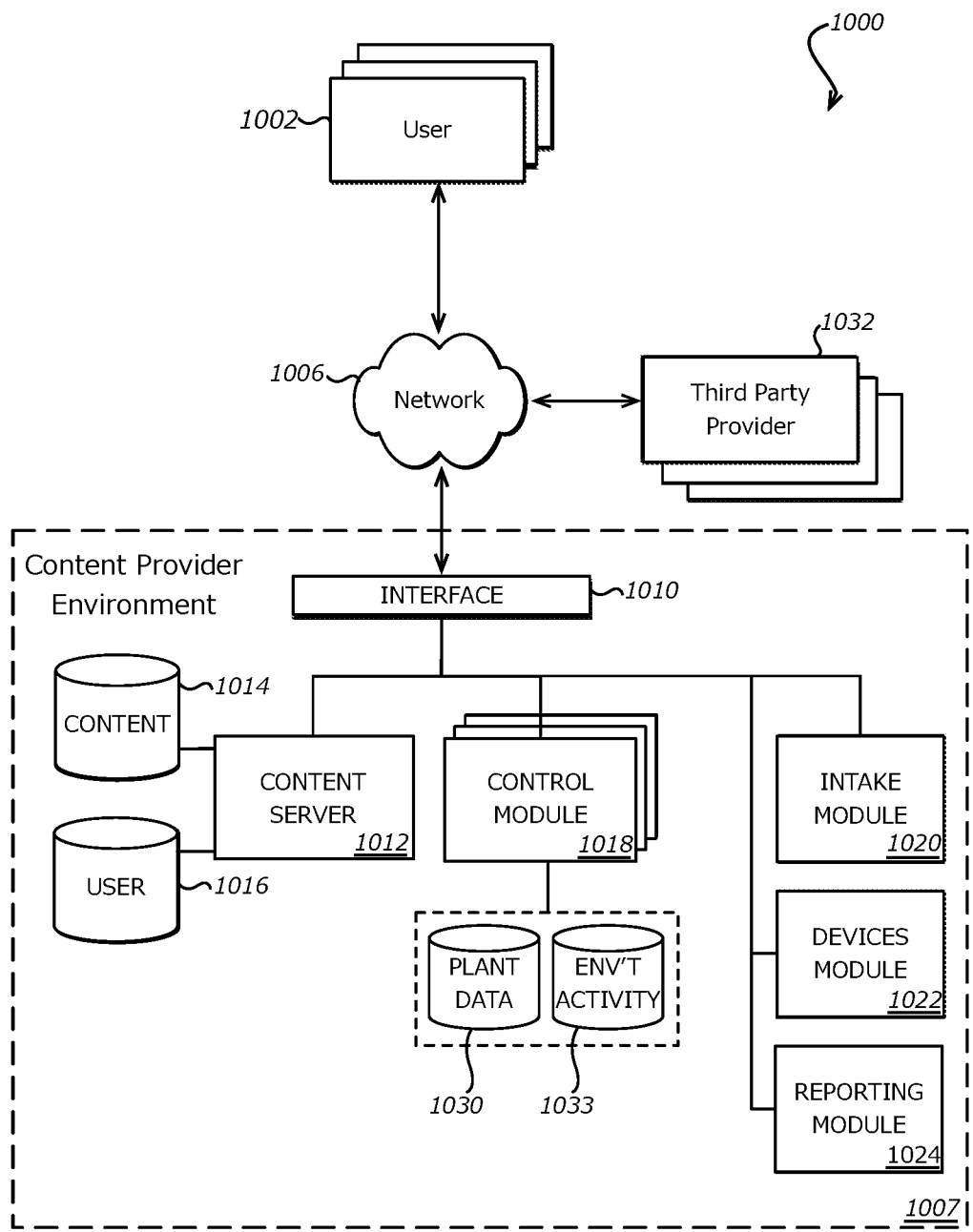
FIG. 10 illustrates an example environment in which aspects of the various embodiments can be implemented.

FIG. 10 illustrates an example environment 1000 in which aspects of the various embodiments can be implemented. In this example, users can utilize an application or interface, such as a browser, executing on user device 1002 to communicate with a plant growing system over at least one network 1006. The user device 1002 can be any appropriate computing device capable of requesting, receiving, and/or presenting content, such as may include a desktop computer, a thin client device or "dummy terminal," a smartphone, an e-book reader, a tablet computer, a notebook computer, a personal data assistant, a video gaming console or controller, a smart television, a wearable computer (e.g., a smartwatch or glasses), or a portable media player, among others.

User device 1002 is in communication with a resource provider 1007 via the at least one network 1006. The at least one network can include a wired and/or wireless network, as may include the Internet, a cellular network, a local area network (LAN), an Ethernet, an Intranet, and the like. The user device 1002 may have varied local computing resources, such as may include central processing units and architectures, memory, mass storage, graphics processing units, communication network availability and bandwidth, etc.

Resource provider 1007 can provide services for plant growing, monitoring, and maintenance. These services can include, for example, agricultural services, gardening and nursery services, academic research in plant science, plant conservation, horticulture and landscaping, among other such services where modular systems for growing plants are considered. In certain embodiments, provider 1007 can be an intermediary between a customer and a company, such as third-party provider 1032. For example, third-party provider 1032 can utilize resource provider 1007 to provide plant growing services in a modular and scalable hydroponics system, and other services described herein.

Requests for monitoring and/or maintaining a plant growing system can be received to an interface and/or networking layer 1010 of the resource provider 1007. The interface and/or networking layer can include any of a number of components known or used for such purposes, as may include one or more routers, switches, load balancers, Web servers, application programming interfaces (APIs), and the like.

The information can be stored in content data store 1014 and as well as information associated with the user in profile data store 1016 until such information is ready to be processed. Other information may be obtained including, for example, plant data (e.g., the type of plant in the system, economic or industrial purpose for the plant, etc.). For example, intake module 1020 can receive a selection a selection of sources for one or more type of plant. The sources can include, for example, plant-related industries such as agricultural organizations, farming businesses, nurseries, herbal medicine and pharmaceutical suppliers, plant conservation groups, etc. The selected sources can be in response to user input specifying a particular plant type, intended economic use for the plant, etc. In certain embodiments, a configuration file or other instructions associated with the plant data can be obtained that specifies one or more plant type and economic purpose of the plant.

Once the sources are identified, a variety of methodologies may be used to retrieve the relevant plant data, including but not limited to, data scrapes, API access, etc. Intake module 1020 obtains plant data associated with the selection. The plant data can be stored in data store 1030 or other appropriate data store. The plant data can include, for example, the type of plant to be grown in the system, related or substitutable/alternative plant species, a timeframe or expected deadlines (e.g., to reach plant maturity, cultivation, harvesting, etc.), geographic region and geographic restrictions on the plant type, etc.

In certain embodiments, intake module 1020 can process the data to determine and configure, for example, environmental characteristics (e.g., in a configuration file) required for the appropriate plant and other information such as geographic restrictions or use restrictions on the plant type, etc. In certain embodiments, intake module 1020 can determine the specific devices required in a system to execute plant growth for the type of plant. For example, if a selected plant requires specific humidity, low water turbidity, high lighting, etc., intake module 1020 can configure the system to include misters, installation of lighting sources, appropriate number and types of water filters, fans for air circulation, etc. When the plant growing system is set up for the specified plant type, intake module 1020 also obtains environmental data (e.g., current environmental conditions in the plant growing system). Environmental data may be stored in a data store 1033.

Control module 1018 is operable to compare environmental data with the plant data (e.g., environmental characteristics required for the specified plant type). In the situation where the environmental data deviates from the environmental characteristics (for example, current water temperature drops below pre-configured temperature range), control module 1018 can control one or more of the devices to adjust the current conditions in the plant growing system. Devices can include, for example, devices operable to controlling the flow rate, lighting, nutrient dosing, pH, etc. For example, in the situation where the air temperature is too high and the humidity is too low for the specified plant type in the system, control module 1018 may cause a heating/cooling device to decrease the temperature and an actuator to rotate the adjustment device to increase the flow of water through the system to meet the requirements as identified in the preconfigured environmental characteristics for the specified plant type.

The devices may be activated by device module 1022. Device module 1022 can also monitor the condition and status of the devices in the system. For example, power to a lighting device may need to be restored or recharged, a water filter may need to be discarded and/or replaced, etc.

Reporting module 1024 is operable to provide reports and/or notifications to a user or other appropriate entity relating to the status of the system. A report or notification may inform a user how well the plant growing system is running and compare usage data (e.g., information about one or more plants, their environment, whether the plants and/or environmental data meet predetermine environmental settings, etc.). The reports and/or notifications may be presented to a user via content server 1012 or another appropriate component.

In accordance with various embodiments, additional or alternative components and elements can be used in such a system in accordance with the various embodiments. Accordingly, it should be noted that additional services, providers, and/or components can be included in such a system, and although some of the services, providers, components, etc., are illustrated as being separate entities and/or components, the illustrated arrangement is provided as an example arrangement and other arrangements as known to one skilled in the art are contemplated by the embodiments described herein. In accordance with various embodiments, the various components described herein may be performed by any number of server computing devices, desktop computing devices, mainframe computers, and the like. Individual devices may implement one of the components of the system. In some embodiments, the system can include several devices physically or logically grouped to implement one of the modules or components of the system. For example, the system can include various modules and components combined on a single device, multiple instances of a single module or component, etc. In one specific, non-limiting embodiment, content server 1012 and control module 1018 can execute on one device and intake module 1020 and reporting module 1024 can execute on another device, and devices module 1022 can execute on yet another device. In another embodiment, the components can execute on the same device or other combination of devices.

In some embodiments, the features and services provided by the system may be implemented as web services consumable via a communication network. In further embodiments, the system is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 11:
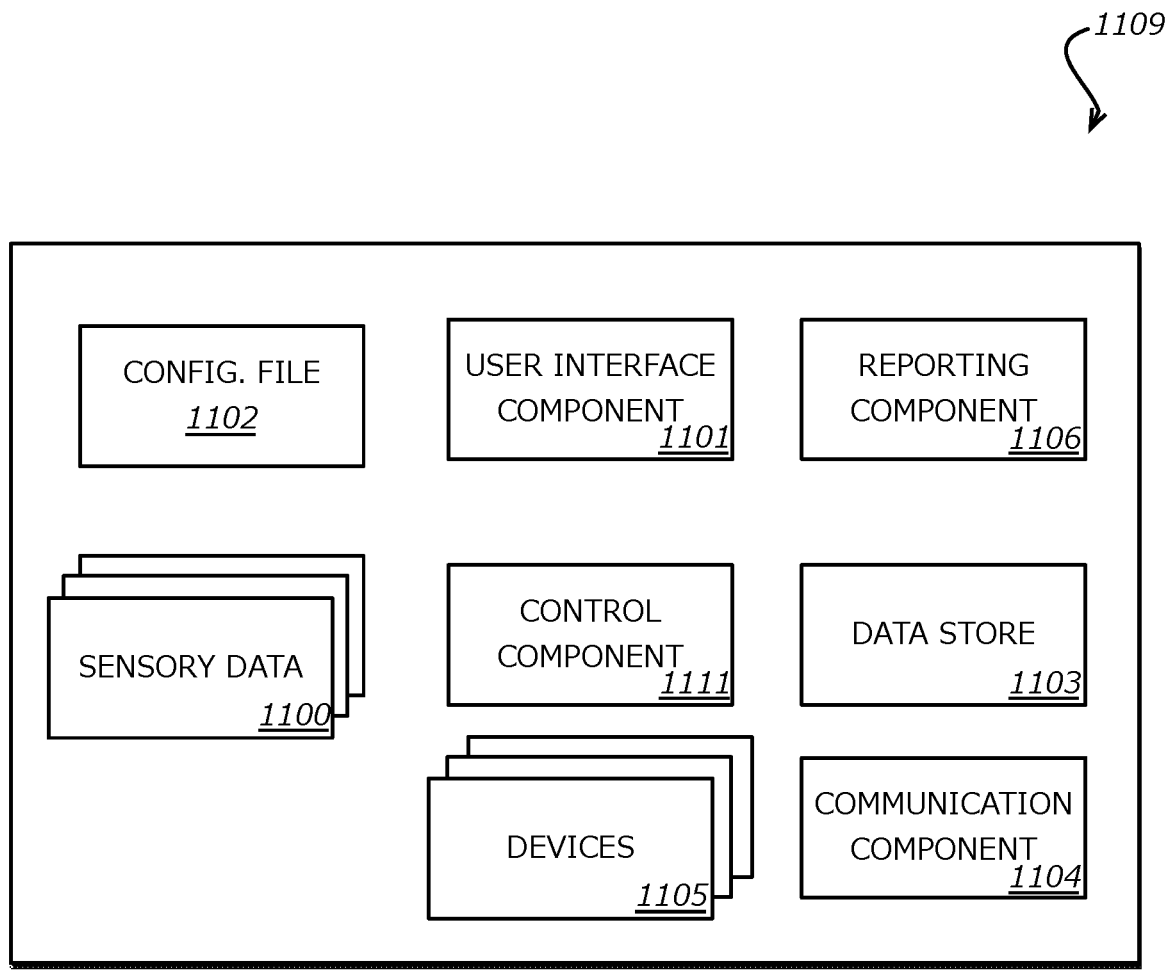
FIG. 11 illustrates example components associated with a control system for a plant growing unit in accordance with various embodiments.

FIG. 11 illustrates example 1109 of components associated with a control system for a plant growing unit in accordance with various embodiments. In this example, the plant growing system may include various types of resources that can be utilized for a variety of different purposes. In at least some embodiments, all or a portion of a given resource or set of resources might be allocated to a particular task. The resources can include, for example, control component 1111, configuration file 1102, sensory data 1100, user interface component 1101, reporting component 1106, data store 1103, devices 1105, and communication component 1104. Accordingly, it should be noted that additional services and/or components can be included in such a system, and although some of the services components, etc., are illustrated as being separate entities and/or components, the illustrated arrangement is provided as an example arrangement and other arrangements as known to one skilled in the art are contemplated by the embodiments described herein.

Control component 1111 is operable to obtain data for one or more plants in a plant growing system as well as data about the environment for those plants, and automatically control aspects of the environment to facilitate optimal plant growth and health. In an embodiment, control component 1111 is in communication with user interface component 1101 operable to generate an interface that provides a view of information associated with one or more plants and the environment of those plants for a plant growing unit. In certain embodiments, the interface can present a view of one or more plants, the inside of a plant growing unit, or some other aspect/area of the system. A user can select a plant from the user interface and can be presented a view of sensory data 1100 associated with the plant and/or environment. Sensory data 1100 can include environmental data (e.g., current conditions), for example, pH, conductivity, flow rate, turbidity, water temperature, air temperature, humidity, water temperature, plant growth rate, plant size and dimensions, and the like.

The sensory data can be stored in data store 1103. Data store 1103 can be local or remote to control component 1111. As used herein, the term "data store" refers to any device or combination of devices capable of storing, accessing and retrieving data, which may include any combination and number of data servers, databases, data storage devices, and data storage media, in any standard, distributed or clustered environment.

Configuration file 1102 is operable to configure and store settings (e.g., threshold settings or setpoints) for one or more plants and environmental conditions. For example, the settings can represent the ideal plant and/or environmental values (e.g., setpoints for environmental characteristics) for optimal growth, such as predefined ranges or thresholds for pH, water conductivity, water flow rate, water turbidity, water temperature, ambient temperature, etc. required for the specific plants in the system. For example, if a plant requires high humidity during its early stages and low humidity during its adult stages, configuration file 1102 may configure settings for acceptable humidity ranges based on the type of plant and the plant's age. Configuration file 1102 may establish a default setting for various plant types. For example, configuration file 1102 may establish a default setting for all tomato plants that includes a predefined air temperature range, humidity range, and concentration of nutrient solution, based on the requirement of an average tomato plant at a given age.

During operation, the sensory data (or other parameters of the plant growing unit) can be monitored and compared to stored settings in configuration file 1102. In the situation where the sensory data fails to satisfy designated setpoints or another threshold, control system 1111 can control one or more devices 1105 to optimize the environment contained in the plant growing unit. Devices 1105 can include, for example, devices operable to controlling the flow rate, lighting, nutrient dosing, pH, etc. For example, in the situation where the air temperature is too high and the humidity is too low for tomato plants in the system, control component 1111 may cause a heating/cooling device to decrease the temperature and an actuator to rotate the adjustment device (as in adjustment device 104 of FIG. 1C) to increase the flow of water through the system to meet the requirements as identified in the environmental settings for tomatoes in configuration file 1102.

The system can continually monitor the plants and/or environment, and update the settings or setpoints in configuration file 1102 as the plants grow and the environment changes. For example, sensory data can be analyzed, and the results can be used to, for example, decrease water, nutrient, and light usage, along with other control parameters over time. The settings can be updated based on a set interval (e.g., hourly, daily, weekly, etc.), manually, an event (e.g., particular growth rate, plant growth amount, temperature, pH, etc.) In an embodiment, one or more setpoints can be updated based on data obtained from other users. For example, a user can, for a set of plants, begin with an initial set of setpoints for those plants. Usage data from systems of other users can be obtained. The usage data can include for example, information about one or more plants, and information about the environment of those plants. This information can include, for example, setpoint values, plant types, plant growth data, environment data, etc. Additional information can be obtained as well, including, for example, timestamp data, and other data to correlate different sets of data.

The usage data can be analyzed to determine a score that quantifies how well a particular plant is growing. The score can be compared with one or more thresholds. For example, a score that satisfies a first threshold may indicate a plant with suboptimal growth, a score that satisfies a second threshold may indicate normal growth, and a score that satisfies a third threshold may indicate optimal growth.

The usage data can be continuously analyzed, and the scores can be used to optimize setpoints for one or more systems. For example, the setpoints can be used to automatically update a user's system. In some embodiments, a message can be presented to a user that optimal setpoints are available. In the situation the user accepts the setpoints, the system can be updated. In various embodiments, a user can manually update the setpoints. A user may also be allowed to share setpoints for their system with other users. For example, a user who has found success with one or more setpoints can share those setpoints with other users so that those setpoints may be implemented in their systems.

In an embodiment, the system can capture image data (e.g., still images and/or video) or other data such as lidar data of one or more plants and/or the plant environment. The data can be captured periodically, manually, in response to an event, or a combination thereof. The data can be stored in data store 1103. In an example, as one or more plants grow, images of the root system and the vegetative growth of one or more plants can be captured and stored.

In accordance with an embodiment, the image data can and other data can be used as training data to train a model such as a neural network or another appropriate machine learning-based model to determine optimal setpoints for a given system, optimal plant environment type, etc. The image data can include, for example, images of roots and other aspects of a plant. The image data can be labeled or otherwise classified (e.g., healthy, not healthy, etc.) In some embodiments, the image data can be associated with additional data, such as environmental conditions, a timestamp, etc. The training data can be obtained from a plurality of control systems, and a training component can learn various combinations or relations of features of plant and optimal growing conditions such that when plant and/or environmental data is obtained, a model can be used to evaluate the data and output the appropriate information so that control component can optimize the environmental conditions for optimal plant growth. In various embodiments, models can be trained for specific plant varieties, environments, and the like. Examples models include, for example, logistic regression, Naïve Baye, random forest, neural network, or support vector machines (SVMs), convolutional recurrent neural network, deep neural network, or other types of neural networks or models, and/or combination of any of the above models, stacked models and heuristic rules. Various other approaches can be used as well as discussed and suggested elsewhere herein.

In an embodiment, control component 1111 can detect or receive an indication of the end of the plant growing cycle. In this situation, the system can initiate a process to clean the system automatically. For example, the system can increase the water temperature and add cleaning detergents to kill off microbes, which may affect the next set of plants growing in the system. If previous plants were to have obtained any disease, system cleaning can ensure a clean, sterile environment for the next grow. The system can check turbidity and conductivity to not only check nutrients during the growing period but also check that detergents have left the system. Users can then connect a hose to the system to drain off the detergent filled water or have it already connected to a drain enabling the user to have a fully automated system. For the later system, a drain valve can be added to the system, which would be normally closed and called by the control system to open if and when the system no longer needed to recycle water.

The system can include a communications component 1104 configured to communicate with, for example, remote servers, database systems, other plant growing controllers, computing devices, sensors, logging services, alert systems (e.g., a fire alarm), building automation systems, and the like.

Reporting component 1106 can be configured to allow a user or other appropriate entity to see how well the system is running and compare usage over time and if any adjustments should be made. Over time this data will help others who own the system with a multitude of plants and improve how the system is used and operated and how it is programmed. For example, the data can be used to tune a system to operate more efficiently or at least to operate in accordance with one or more setpoints or other thresholds.

In accordance with various embodiments, the various components described herein may be performed by any number of server computing devices, desktop computing devices, mainframe computers, programmable logic controllers, and the like. Individual devices may implement one of the components of the system. In some embodiments, the system can include several devices physically or logically grouped to implement one of the modules or components of the plant growing unit. In some embodiments, the features and services provided by the system may be implemented as web services consumable via a communication network. In further embodiments, the system is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 12A:
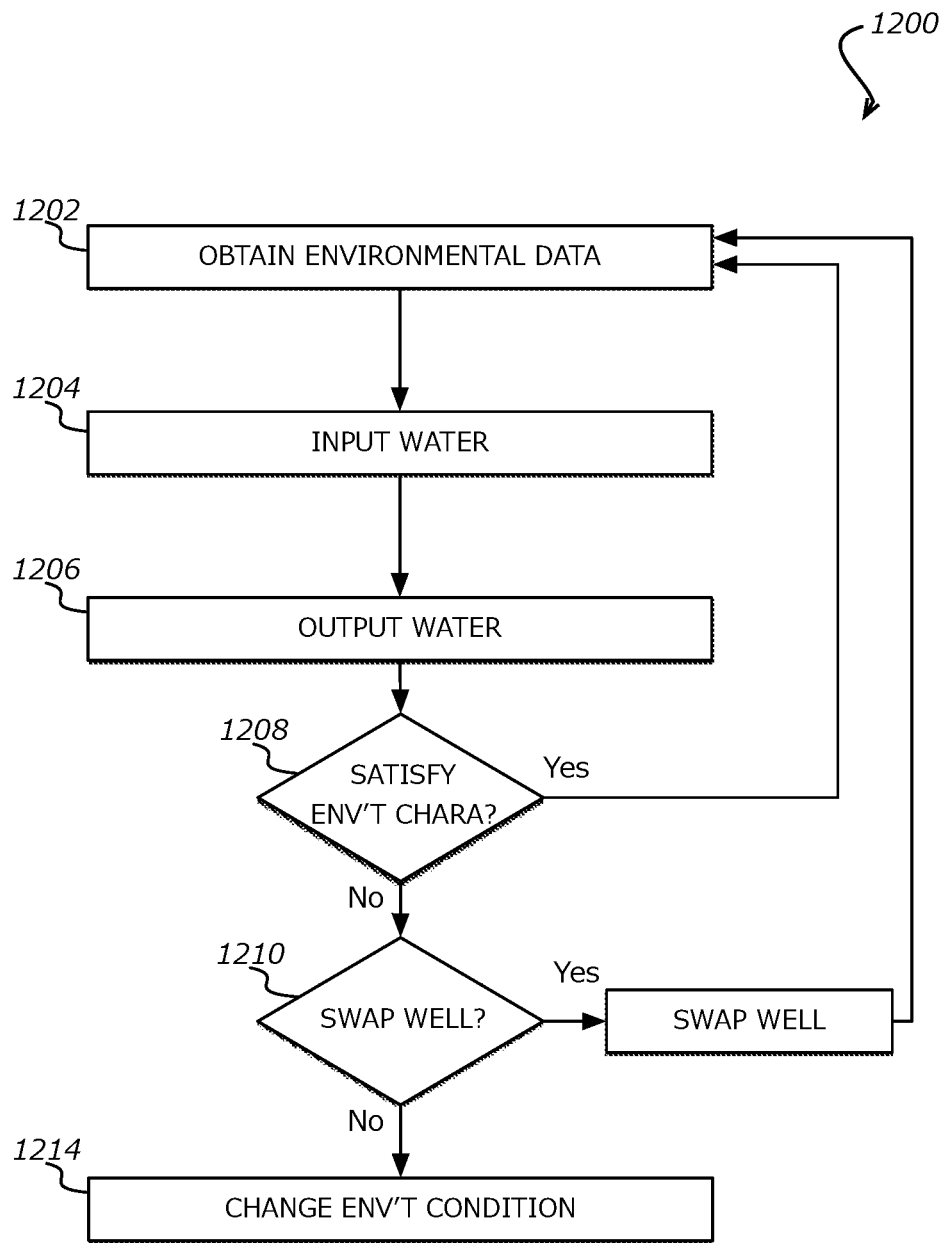
FIGS. 12A and 12B illustrates an example processes for utilizing a plant growing unit in accordance with various embodiments.

FIG. 12A shows an example process 1200 for utilizing a plant growing unit in accordance with various embodiments. In the example, the process obtains 1202 environmental data, for example, current conditions of pH, conductivity, flow rate, turbidity, water temperature, air temperature, humidity, water temperature, plant growth rate, plant size and dimensions, and the like. The process inputs 1204 water into the system through an inlet pipe at an inlet end (also referred to as inlet side) of the plant growing unit. Water fills and flows through the enclosed horizontal space above the wells of the plant growing unit, passing through the roots of each suspended plant. Water is output 1206 (e.g., exits) the plant growing unit through an outlet pipe on an outlet end (e.g., opposite of the inlet end) of the plant growing unit. The wells may be extended in depth to accommodate the lower roots of plant 106, such that the roots can grow downward, as opposed to growing laterally and/or densely within a vertically restricted space. Therefore, as water flows through the plant growing unit, suspension of the plant roots freely over wells of adjustable depth prevents the roots of plants positioned upstream (e.g., plants closer to inlet pipe) from damming up or impeding the water flow, and thus the water or other nutrients can reach plants downstream (e.g., closer to the outlet pipe). The floor of the space above the wells may be level, and the water may flow from inlet end to outlet end based on water pressure from the inlet pipe. In some embodiments, from the inlet to the outlet there is a decrease in gradient to allow the water to easily flow from one side to the other based on gravity.

The process obtains environmental characteristics and determines 1208 whether environmental data satisfies the environmental characteristics. An automated feedback system may continuously collect and compare environmental data with environmental characteristics. Environmental characteristics can be settings that include setpoints, ranges, and thresholds for environmental conditions that are required for a particular plant type to grow optimally. For example, environmental characteristics may include predefined ranges or thresholds for pH, water conductivity, water flow rate, water turbidity, water temperature, ambient temperature, etc. required for the specific plants in the system. The environmental characteristics may be stored in a configuration file or entered manually. For example, if a plant requires high humidity during its early stages and low humidity during its adult stages, the configuration file may configure settings for acceptable humidity ranges based on the type of plant and the plant's age. In another example, default settings may be established for various plant types. For example, a default setting may be established for all tomato plants that includes a predefined air temperature range, humidity range, and concentration of nutrient solution, based on the requirement of an average tomato plant at a given age.

If the environmental data does not satisfy the environmental characteristics for the plant type in the plant growing system, the process determines 1210 whether the wells need to be swapped (e.g., removed and/or replaced). In the example, a well containing too many waste particulates may need to removed and discarded. In another example, the roots above a well may grow too long and require its current well to be replaced with a deeper sized well. In accordance with an embodiment, a well can be associated with a lid that can be used to shut the cavity of the well, creating a watertight seal which allows the well to be "hot swapped" (e.g., removed from the system without losing water from the system and/or disturbing the continuous flow of water through the system, and without disturbing neighboring plants and their respective wells). The well may be securely connected to the plant growing unit, for example, via magnets, latches, clamps, snap connectors, screw threads, etc. Thus, the well can be detachable from the plant growing unit, and closing the well with the lid prior to detachment creates a watertight seal which allows for hot swapping of the well without water loos, water flow interruption, or other disturbances to the system.

In accordance with an embodiment, if the well does not need to be replaced, but other environmental conditions must be adjusted to satisfy the environmental characteristics of the plant type, then the process identifies and changes 1214 the other environmental condition. For example, an environmental characteristic can require low water turbidity (i.e., less particulates or waste in the water) but the automated feedback system reads high water turbidity, the system may control an adjustment device attached to the outlet pipe to flush the turbid water out quickly. For example, the adjustment device may include an outlet valve partially encased in a housing at the outlet pipe. When the adjustment device is rotated about an axis parallel to the length of the outlet pipe (e.g., about a vertical axis), the outlet valve may be gradually covered or exposed by the housing, thereby increasing or decreasing the flowrate of water exiting the outlet pipe. The adjustment device may also be moved upward or downward, such that the position of the outlet valve controls the water height in the system. Thus, in this example, the adjustment device may be lowered and/or rotated to increase the size of the outlet valve, such that the turbid water can exit the system quickly. In another example, an inlet valve partially encased in a housing at the inlet pipe may be rotated about an axis parallel to the length of the inlet pipe, to cover or expose the inlet valve to change the flowrate (e.g., of the incoming water).

In yet another example, other environmental conditions may be changed to satisfy the environmental characteristics. The system may activate various devices to control, for example, the lighting, nutrient dosing, water pH, etc. For example, in the situation where the air temperature is too high and the humidity is too low for tomato plants in the system, a heating/cooling device may decrease the temperature, lighting devices installed above the well may be shut off, and an actuator may rotate the adjustment device to increase the flow of water through the system.

Figure 12B:
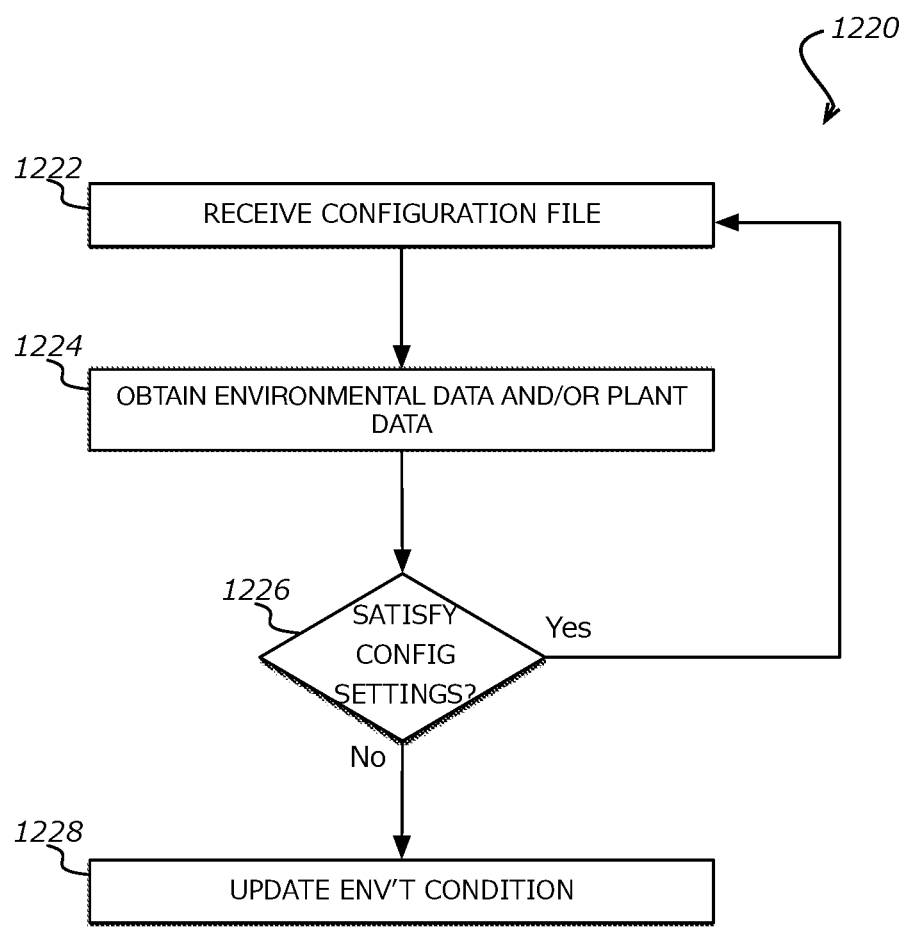

FIG. 12B shows another example process 1220 for utilizing a plant growing unit in accordance with various embodiments. In the example, the process receives 1222 a configuration file (e.g., system settings for environmental characteristics required for optimal plant growth). The configuration file can be received from, for example, a remote server. The configuration file may also be manually set. The configuration file may configure settings for environmental characteristics (e.g., environmental conditions) that are optimal for a given plant at a given plant age, for example, a plurality of acceptable humidity ranges for a basil plant at each of the plant's life stages (e.g., seed stage, sprout stage, seedling stage, and adult stage). In another example, the configuration file can establish a default setting for various plant types. For example, a default setting for all tomato plants may include a predefined air temperature range, humidity range, and concentration of nutrient solution, based on the requirement of an average tomato plant at a given age. The configuration file may also include other information about the plant, such as geographic restrictions or use restrictions on the plant type, etc.

The process obtains 1224 environmental data (e.g., current environmental conditions in the plant growing system) and/or plant data (e.g., current quality of the plant). For example, environmental data can include current values of pH, conductivity, flow rate, turbidity, water temperature, air temperature, humidity, water temperature, plant growth rate, plant size and dimensions and the like. Sensors (e.g., pH sensors, oxygen sensors, thermometers, light sensors, conductivity sensors, pressure sensors, etc.), cameras, and the like can be used to collect the environmental data and/or plant data. Sensors may be located within various location in the plant growing system. For example, the sensors for detecting water quality (e.g., pH sensors, turbidity sensors, etc.) can be positioned within a water reservoir which collects output water from the outlet and filters and pumps freshwater into the inlet. Such sensors can thus measure the current quality of the water exiting the system (e.g., after flowing through the plant roots) as well as the quality of the water entering the system (e.g., the water used to feed the plant roots).

In another example, lighting devices and cameras, etc., may be placed inside the plant growing unit above the wells and beside the suspended plant roots to illuminate the area periodically and collect image data of the current conditions of the plant. For example, plant data based on collected image data may include the health status of the roots (e.g., infestation or infection information, healthy color, etc.), the size of the roots, growth rate, any obstruction or entanglement with neighboring roots, root density (e.g., dense roots dam up water flow to downstream plants), etc.

The process compares and determines 1226 whether the environmental data and/or plant data meets the configuration file settings. The environmental data and/or plant data may be collected and compared periodically, manually, based on an event, or a combination thereof. For example, environmental data and/or plant data can be collected over a predefined time interval (e.g., hourly daily, weekly, etc.). The data collection and comparison may also be triggered based on an event (e.g., particular growth rate, plant growth amount, temperature reaches above a threshold, pH changes by a predefined value, waterflow decreases by a predefined rate, etc.).

When the environmental data and/or plant data fails to meet the configuration file settings, the process updates 1228 the environmental conditions accordingly. For example, one or more devices can be identified in the configuration file as appropriate for adjusting the environmental conditions necessary to return the system to the configured settings for the plant. Such devices can include, for example, devices operable to controlling the water flow rate, lighting, nutrient dosing, pH, etc. For example, if environmental data indicates oxygen levels in the water are below a preconfigured threshold for the plant, air stones may be lowered into the water (e.g., water reservoir) to aerate the water. In another example, airline feeds in the water reservoir can be connected to an air pump to aerate the water and increase the water oxygen levels to meet the threshold as set in the configuration file.

Figure 13:
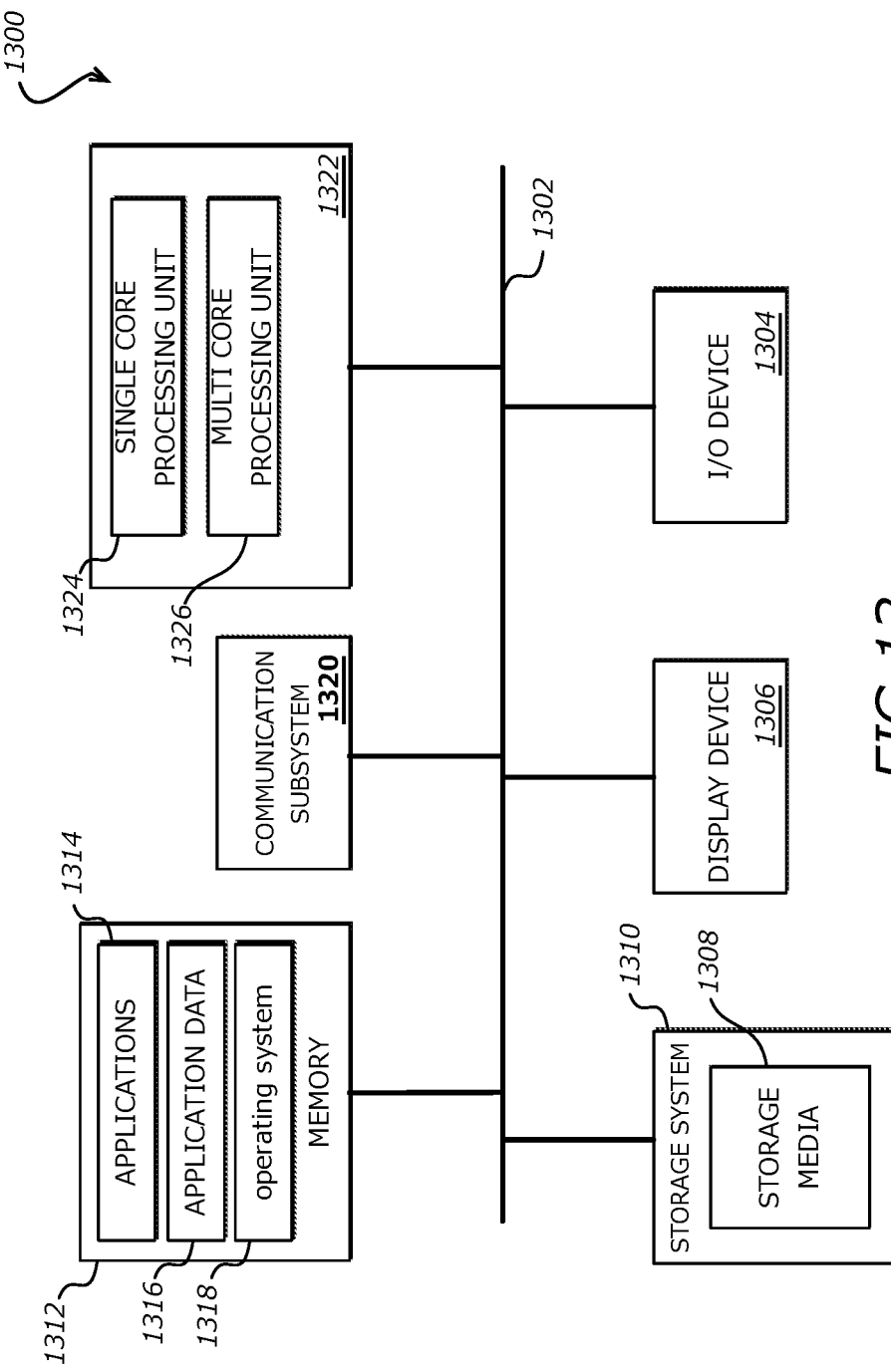
FIG. 13 illustrates an example computer system that can be utilized in accordance with various embodiments.

FIG. 13 shows an example computer system 1300, in accordance with various embodiments. In various embodiments, computer system 1300 may be used to implement any of the systems, devices, or methods described herein. In some embodiments, computer system 1300 may correspond to any of the various devices described herein, including, but not limited, to mobile devices, tablet computing devices, wearable devices, personal or laptop computers, vehicle-based computing devices, or other devices or systems described herein. As shown in FIG. 13, computer system 1300 can include various subsystems connected by a bus 1302. The subsystems may include an I/O device subsystem 1304, a display device subsystem 1306, and a storage subsystem 1310, including one or more computer-readable storage media 1308. The subsystems may also include a memory subsystem 1312, a communication subsystem 1320, and a processing subsystem 1322.

In system 1300, bus 1302 facilitates communication between the various subsystems. Although a single bus 1302 is shown, alternative bus configurations may also be used. Bus 1302 may include any bus or other components to facilitate such communication as is known to one of ordinary skill in the art. Examples of such bus systems may include a local bus, parallel bus, serial bus, bus network, and/or multiple bus systems coordinated by a bus controller. Bus 1302 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1304 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1304 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 1300 may include a display device subsystem 1306. Display device subsystem may include one or more lights, such as one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1306 may include a controller and/or interface for controlling and/or communicating with an external display, such as any of the above-mentioned display technologies.

As shown in FIG. 13, system 1300 may include storage subsystem 1310 including various computer-readable storage media 1308, such as hard disk drives, solid-state drives (including RAM-based and/or flash-based SSDs), or other storage devices. In various embodiments, computer-readable storage media 1308 can be configured to store software, including programs, code, or other instructions, that is executable by a processor to provide the functionality described herein. In some embodiments, storage subsystem 1310 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage subsystem 1310 can include a media reader, card reader, or other storage interfaces to communicate with one or more external and/or removable storage devices. In various embodiments, computer-readable storage media 1308 can include any appropriate storage medium or combination of storage media. For example, computer-readable storage media 1308 can include, but is not limited to, any one or more of random-access memory (RAM), read-only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer-readable storage media can include data signals or any other medium through which data can be transmitted and/or received.

Memory subsystem 1312 can include various types of memory, including RAM, ROM, flash memory, or other memory. Memory subsystem 1312 can include SRAM (static RAM) or DRAM (dynamic RAM). In some embodiments, memory subsystem 1312 can include a BIOS (basic input/output system) or other firmware configured to manage initialization of various components during, e.g., startup. As shown in FIG. 13, memory subsystem 1312 can include applications 1314 and application data 1316. Applications 1314 may include programs, code, or other instructions, that can be executed by a processor. Applications 1314 can include various applications such as browser clients, campaign management applications, data management applications, and any other application. Application data 1316 can include any data produced and/or consumed by applications 1314. Memory subsystem 1312 can additionally include operating system 1318, such as macOS®, Windows®, Linux®, various UNIX® or UNIX- or Linux-based operating systems, or other operating systems.

System 1300 can also include a communication subsystem 1320 configured to facilitate communication between system 1300 and various external computer systems and/or networks (such as the Internet, a local area network (LAN), a wide area network (WAN), a mobile network, or any other network). Communication subsystem 1320 can include hardware and/or software to enable communication over various wired (such as Ethernet or other wired communication technology) or wireless communication channels, such as radio transceivers to facilitate communication over wireless networks, mobile or cellular voice and/or data networks, Wi-Fi networks, or other wireless communication networks. Additionally, or alternatively, communication subsystem 1320 can include hardware and/or software components to communicate with satellite-based or ground-based location services, such as GPS (global positioning system). In some embodiments, communication subsystem 1320 may include, or interface with, various hardware or software sensors. The sensors may be configured to provide continuous or and/or periodic data or data streams to a computer system through communication subsystem 1320

As shown in FIG. 13, processing system 1322 can include one or more processors or other devices operable to control computing system 1300. Such processors can include single-core processors 1324, multi-core processors, which can include central processing units (CPUs), graphical processing units (GPUs), application specific integrated circuits (ASICs), digital signal processors (DSPs) or any other generalized or specialized microprocessor or integrated circuit. Various processors within processing system 1322, such as processors 1324 and 1326, may be used independently or in combination depending on the application.

Various other configurations are may also be used, with particular elements that are depicted as being implemented in hardware may instead be implemented in software, firmware, or a combination thereof. One of ordinary skill in the art will recognize various alternatives to the specific embodiments described herein.

The various embodiments can be implemented in a wide variety of operating environments, which in some cases can include one or more user computers or computing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the internet, an intranet, an extranet, a public switched telephone network, an infrared network, a wireless network and any combination thereof.

In embodiments utilizing a web server, the web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer-readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

The methods, systems, and devices discussed above are described with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the above description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Having been provided with the description and illustration of the present application, one skilled in the art may envision variations, modifications, and alternate embodiments falling within the general inventive concept discussed in this application that do not depart from the scope of the following claims.

What is claimed is:
1. A plant growing system, comprising:
   a plurality of wells, each well being configured to contain roots of a corresponding plant, wherein a depth of each well is selectively adjustable to accommodate the varying lengths of the roots of the corresponding plant;

an enclosure configured to enable the plurality of wells to securely connect thereto, the enclosure including a plurality of openings disposed to receive a basket, the basket allowing roots of a plant to extend substantially along a vertical axis into a well, the vertical axis being defined as orthogonal to a plane formed by a top portion and a bottom portion of the enclosure;

an inlet element positioned on a first end of the enclosure, the inlet element operable to couple to a reservoir to obtain inlet water, the inlet element including an inlet body portion having an inlet valve, the inlet body portion positioned in an inlet housing, the inlet body portion configured to rotate about an axis parallel to a length of the inlet element, wherein rotating the inlet body portion changes a size of the inlet valve;

an outlet element positioned on a second end of the enclosure, the outlet element configured to operate as an outlet for output water, the outlet element including an outlet body portion having an outlet valve, the outlet body portion positioned in an outlet housing, the outlet body portion configured to one of rotate about an axis parallel to a length of the outlet element or move vertically to change a vertical position of the outlet valve, wherein rotating the outlet body portion changes a size of the outlet valve, and wherein the vertical position of the outlet valve controls a height of the water in the enclosure;

a plurality of watertight seals, each water tight seal being configured to be positioned over a corresponding well, wherein each watertight seal is configured to block the inlet water from entering the corresponding well; and a control unit operable to control the vertical position of the outlet body portion to control the height of water in the enclosure in response to real-time environmental data within the enclosure.

2. The plant growing system of claim 1, wherein at least one of the wells is configurable in size.

3. The plant growing system of claim 1, wherein the plurality of wells is configured to detachably connect to the enclosure.

4. The plant growing system of claim 1, wherein the top portion of the outlet housing is connected to a pressure valve, the pressure valve configured to move the outlet body portion vertically to change a vertical position of the outlet valve.

5. The plant growing system of claim 1, further comprising:
a plant support element, the plant support element configured to securely attach to the enclosure and provide plant structural support to facilitate plant growth.

6. The plant growing system of claim 1, further comprising:
a camera, the camera affixed inside the enclosure and configured to capture image data of plant growth progress.

7. The plant growing system of claim 6, wherein the camera is further configured to analyze the image data and provide feedback to the control unit.

8. The plant growing system of claim 1, further comprising:
an actuator coupled to a rotational actuation feature of the plant growing system, wherein the actuator comprises at least one of an electric motor, a hydraulic motor and a pneumatic motor.

9. The plant growing system of claim 1, wherein the plurality of root enclosures are configured to be adjustable in width, allowing for accommodation of different plant types.

10. The plant growing system of claim 1, wherein the control unit is further operable to control the flow rate based on the size of the roots of the plant.

11. The plant growing system of claim 1, wherein the configuration file further includes parameters for nutrient levels in the water.

12. The plant growing system of claim 1, wherein the control unit is further operable to control the inlet element and the outlet element based on a predetermined watering schedule.

13. The plant growing system of claim 1, wherein the control unit is further operable to control the inlet element and the outlet element based on a detected moisture level in the plurality of root enclosures.

14. The plant growing system of claim 1, further comprising a lighting system, the lighting system configured to provide light to plants in the plurality of root enclosures.

15. The plant growing system of claim 14, wherein the control unit is further operable to control the lighting system based on the at least one environmental factor.

16. The plant growing system of claim 14, wherein the control unit is further operable to control the lighting system based on a predetermined lighting schedule.

* * * * *